United States Patent
Saroiu et al.

(10) Patent No.: US 11,900,127 B2
(45) Date of Patent: *Feb. 13, 2024

(54) AUTOMATED RECOVERY OF FAR EDGE COMPUTING INFRASTRUCTURE IN A 5G NETWORK

(71) Applicant: Microsoft Technology Licensing, LLC, Redmond, WA (US)

(72) Inventors: Stefan Saroiu, Redmond, WA (US); Varun Gandhi, Boston, MA (US); Alastair Wolman, Seattle, WA (US); Landon Prentice Cox, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/545,767

(22) Filed: Dec. 8, 2021

(65) Prior Publication Data
US 2023/0176876 A1 Jun. 8, 2023

(51) Int. Cl.
*G06F 21/60* (2013.01)
*G06F 9/44* (2018.01)
(Continued)

(52) U.S. Cl.
CPC .......... *G06F 9/4406* (2013.01); *G06F 21/606* (2013.01); *H04W 24/04* (2013.01)

(58) Field of Classification Search
None
See application file for complete search history.

(56) References Cited

U.S. PATENT DOCUMENTS 10,452,384 B2  10/2019  England
10,838,815 B2 * 11/2020  Narasimhan .......... G06F 9/4403
(Continued)

FOREIGN PATENT DOCUMENTS

DE   102020127108 A1   6/2021
WO     2020231952 A1  11/2020

OTHER PUBLICATIONS

Huber, et al., "The Lazarus Effect: Healing Compromised Devices in the Internet of Small Things", In Proceedings of the 15th ACM Asia Conference on Computer and Communications Security, Oct. 5, 2020, pp. 6-19.
(Continued)

*Primary Examiner* — Fahmida Rahman
(74) *Attorney, Agent, or Firm* — Mark K. Young; Mark K. Young PC

(57) ABSTRACT

Cryptographically-secured deferral tickets provided by a minting process that runs in a secure enclave on a computing device reset an authenticated watchdog timer that reboots the device from a hardware-protected recovery operating system to re-image the device into a known good state if the timer expires. The deferral tickets are written to a secure channel using a symmetric key that is provisioned by repurposing a existing Intel SGX (Software Guard Extension) Versioning Support protocol that enables migration of secrets between enclaves that have the same author. In an illustrative embodiment, the deferral ticket minting process and authenticated watchdog timer execute locally to enable automated recovery of the computing device when utilized in far edge infrastructure of a fifth generation (5G) network such as a distributed unit (DU) of a radio access network (RAN).

18 Claims, 25 Drawing Sheets

(51) Int. Cl.
    *G06F 9/4401*     (2018.01)
    *H04W 24/04*     (2009.01)

(56) References Cited

U.S. PATENT DOCUMENTS

| | | | |
|---|---|---|---|
| 2006/0047876 A1* | 3/2006 | Stultz | G06F 13/24 |
| | | | 710/260 |
| 2012/0159028 A1 | 6/2012 | Zimmer et al. | |
| 2018/0114012 A1 | 4/2018 | Sood et al. | |
| 2019/0042780 A1 | 2/2019 | Brannock et al. | |
| 2019/0104415 A1 | 4/2019 | Gehrmann | |
| 2020/0143042 A1 | 5/2020 | Dhoble et al. | |
| 2020/0313893 A1 | 10/2020 | Thom et al. | |
| 2021/0365559 A1* | 11/2021 | Jayakumar | G06F 21/572 |
| 2022/0229748 A1* | 7/2022 | Ostrikov | G06F 11/0772 |

OTHER PUBLICATIONS

Ortiz, et al., "Inspire-5Gplus: Intelligent Security And Pervasive Trust For 5G And Beyond Networks", In Proceedings of the 15th International Conference on Availability, Reliability and Security, Aug. 25, 2020, 10 Pages.
"International Search Report and Written Opinion Issued in PCT Application No. PCT/US22/048901", dated Feb. 10, 2023, 11 Pages.
Xu, et al., "Dominance as a New Trusted Computing Primitive for the Internet of Things", In Proceedings of IEEE Symposium on Security And Privacy, May 19, 2019, pp. 1415-1430.
Lee, et al., "Keystone: An Open Framework for Architecting TEEs", In Repository of arXiv:1907.10119v2, Sep. 7, 2019, 18 Pages.

\* cited by examiner

800

200

2400

AUTOMATED RECOVERY OF FAR EDGE COMPUTING INFRASTRUCTURE IN A 5G NETWORK

BACKGROUND

Fifth generation (5G) mobile networks offer the ability to connect tens of billions of intelligent devices, densely deployed and generating orders of magnitude more data to be handled by the network. Consumers' expectations for 5G mobile networks are high and mobile network operators will be under real pressure from enterprise customers to move quickly, delivering 5G's low latency, dense coverage, and high-performance capabilities to enable near-real-time management and control of critical business operations.

SUMMARY

A computing device deployed in far edge computing infrastructure as part of a radio access network (RAN) portion of a 5G (fifth generation) mobile network is configured with an authenticated watchdog timer. When activated, the authenticated watchdog timer causes the computing device to reboot into a known good state from a recovery operating system (OS) stored in an isolated read-only partition to enable automated recovery and re-imaging of the computing device in the event that it fails, becomes unresponsive, or is compromised by malware. The authenticated watchdog timer can be periodically reset to defer activation by the presence of deferral tickets.

The deferral tickets are generated locally using a ticket minting process that runs in a secure runtime environment such as an Intel SGX (Software Guard Extension) enclave, a virtual machine protected by AMD SEV (Secure Encrypted Virtualization), or an ARM TrustZone environment that runs on the processor in the computing device. The ticket minting enclave may perform various runtime integrity checks of computing device state when determining whether to generate a deferral ticket. The ticket minting enclave may also be in contact with a trusted, centralized authority, such as a cloud provider, to determine whether the centralized authority deems the computing device operational and in good state. If this is not the case, the ticket minting enclave will not generate a deferral ticket. The logic that checks for the deferral tickets runs in a secure environment that has two properties. First, this environment runs periodically to check for the presence of a fresh deferral ticket; this periodic check cannot be turned off or disrupted even if the system becomes compromised. Second, this environment can reboot and re-image the entire computing platform with a clean, recovery environment. One example of such a secure environment is an x86 mode called System Management Mode (SMM) that can enable trusted UEFI (Unified Extensible Firmware Interface) firmware, a trusted UEFI enclave, and other trusted code to run in parallel with an untrusted OS on the computing device.

The processor is configured to receive a System Management Interrupt (SMI) periodically. Once configured, an SMI cannot be disabled even if the rest of the system becomes compromised. When invoked the System Management Interrupt executes SMM code to instantiate a trusted SMI handler that executes as a runtime part of the UEFI. The SMI handler checks for the presence of a fresh deferral ticket. If the ticket is valid, the SMI code deems the computing platform in good state and lets the rest of the system resume operation. If the ticket is invalid or absent, SMI manages the reboot and re-imaging processes from the recovery OS. To manage the security challenges posed by a malicious OS that could disrupt the reboot, a secure delivery channel is established between the ticket minting enclave and the SMI handler. Deferral tickets are cryptographically protected using a symmetric key that is commonly shared by the ticket minting enclave and SMI handler and written to the secure delivery channel.

The commonly-shared symmetric key is provisioned by repurposing an existing Intel SGX Versioning Support protocol that enables migration of secrets between enclaves that have the same author (e.g., the UEFI and deferral ticket minting enclaves). In a pre-boot process on the computing device, the UEFI initiates the UEFI-based enclave using a secure enclave runtime environment such as an Intel SGX enclave. The symmetric key is generated by the UEFI enclave and stored in hardware-protected memory which may be subsequently accessed by the UEFI and the SMI handler. In a post-boot process, the untrusted OS initiates the deferral ticket minting enclave that generates the commonly-shared symmetric key using Intel SGX Versioning Support and stores it in processor reserved memory (PRM) that is inaccessible to other software including the untrusted OS.

Utilization of a trusted SMI handler in the UEFI runtime and the SGX enclaves advantageously provides a self-healing mechanism to enable recovery from software failures and security compromises such as ransomware attacks in far edge 5G network infrastructure in an automated manner that is fully locally-implemented. The present solution represents a small attack surface for detecting when the software stacks of a 5G RAN has become compromised on the computing device. Security is enhanced by trusted enclaves locally instantiated on the computing device that enable the deferral ticket minting process to be isolated from the untrusted OS while reducing opportunities for malicious attacks that target remote control schemes and networking paths. In addition, the integrity checks performed by the ticket minting enclave enables runtime introspection of the RAN using trusted processes having hardware-enforced isolation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

Figure 1:
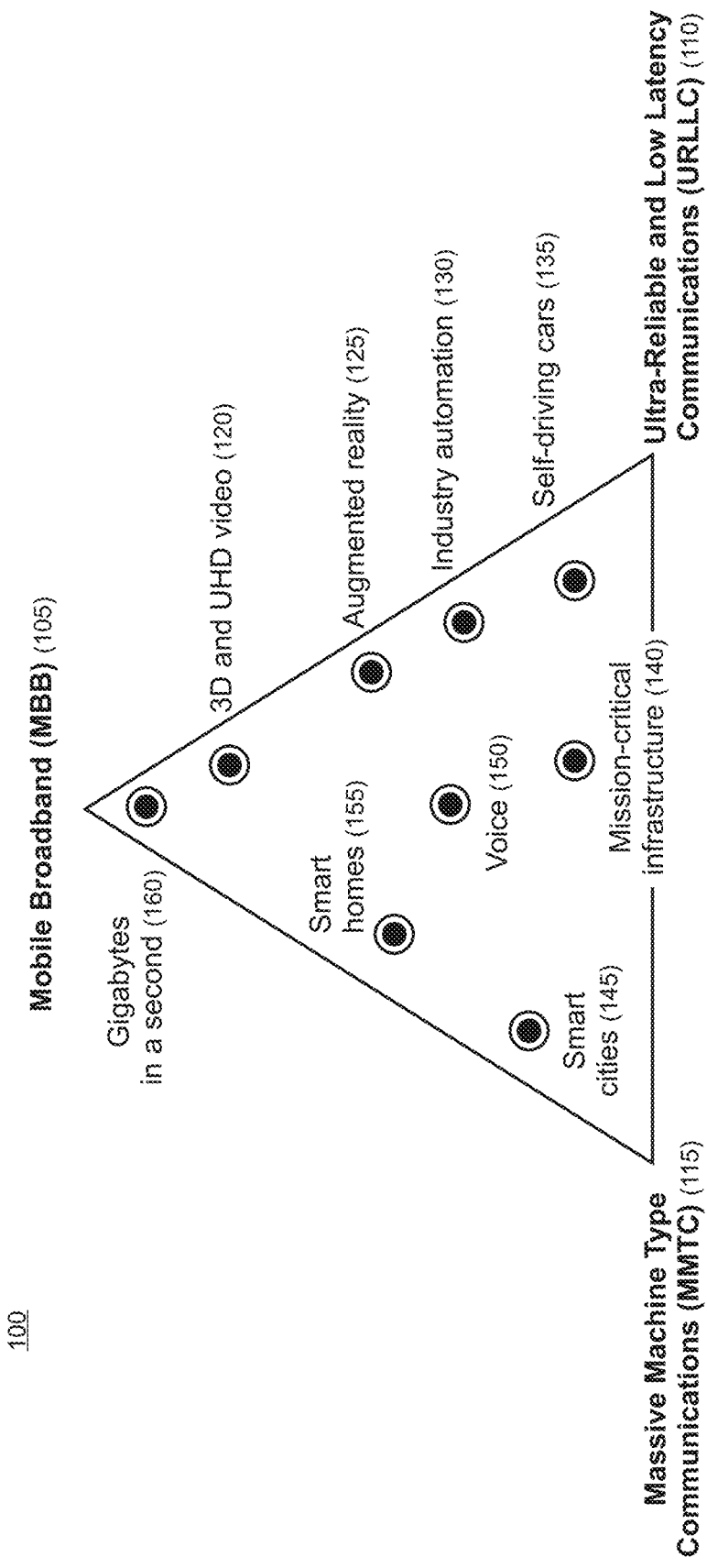
FIG. 1 shows illustrative 5G network usage scenario examples.

DETAILED DESCRIPTION 5G mobile networks utilize a service-based architecture that supports data connectivity and services enabling deployments using techniques such as, for example, Network Function Virtualization (NFV), Software Defined Networking (SDN), and cloud computing. Some exemplary features and concepts of 5G networking include separating User Plane (UP) functions from Control Plane (CP) functions allowing independent scalability, evolution, and flexible deployment across, for example, centralized locations and/or distributed (i.e., remote) locations. The functional design of 5G networks is modularized to enable flexible and efficient network slicing. Dependencies are also minimized between the Radio Access Network (RAN) and the Core Network (CN). The 5G architecture is thus defined with a converged core network with a common AN-CN interface which integrates different Access Types, for example 3GPP (3rd Generation Partnership Project) access and untrusted non-3GPP access such as WiMAX, cdma2000®, WLAN, or fixed networks.

The International Mobile Telecommunications (IMT) recommendation for 2020 from the International Telecommunication Union Radiocommunication Sector (ITU-R M.2083-0) envisions usage scenarios for 5G networks that include: Mobile Broadband (MBB), as indicated by reference numeral 105; Ultra-Reliable and Low Latency Communications (URLLC) 110; and Massive Machine Type Communications (MMTC) 115, as shown in the usage scenario footprint 100 in FIG. 1.

The MBB usage scenario 105 addresses the human-centric use cases for access to multi-media content, services, and data. The demand for mobile broadband will continue to increase, leading to enhanced Mobile Broadband. The enhanced MBB usage scenario will come with new application areas and requirements in addition to existing MBB applications for improved performance and an increasingly seamless user experience. The enhanced MBB usage scenario may cover a range of cases, including wide-area coverage and hotspot, which have different requirements.

For the hotspot case (i.e., for an area with high user density), very high traffic capacity is needed, while the requirement for mobility is typically low and user data rate is higher than that of wide-area coverage. For the wide-area coverage case, seamless coverage and medium to high mobility are desired, with much improved user data rates—20 Gbps for download and 10 Gbps for upload—compared to existing data rates. However, the data rate requirement may be relaxed compared to hotspot.

The URLLC usage scenario 110 may typically have relatively stringent requirements for capabilities such as latency and availability. For example, latency in the RAN may be expected to be less than 1 ms with high reliability. Some examples include wireless control of industrial manufacturing or production processes, remote medical surgery, distribution automation in a smart grid, transportation safety, etc.

The MMTC usage scenario may be characterized by a very large number of connected devices such as Internet of Things (IoT) devices with hundreds of thousands of connected devices per square kilometer. MMTC may also be referred to as "Massive IoT" (MIoT) in some 5G literature. Such connected devices can be expected to transmit a relatively low volume of non-delay-sensitive data. Devices are typically required to be low cost and have a very long battery life.

Illustrative applications for 5G networking are also shown in FIG. 1. The applications can fall within the usage scenario examples 100 at different locations, depending on a given balance of application networking requirements. As shown, the illustrative applications can include three-dimensional and/or ultra-high-definition (3D and UHD) 120; augmented reality 125; industry automation 130; self-driving cars 135; mission-critical infrastructure 140; smart cities 145; voice 150; smart homes 155; and gigabytes in a second 160.

It is emphasized that the ITU expects additional 5G usage scenarios and applications to emerge, and 5G network operators may not necessarily be limited to or required to support any particular usage scenarios or pre-defined slice types. Similarly, application and service providers may be expected to leverage the higher speeds and lower latency of 5G to develop feature-rich capabilities for all kinds of connected devices (both fixed and mobile), deliver compelling user experiences across a range of computing devices and platforms, and further realize the potential of artificial intelligence (AI) and IoT in a way that current connectivity prohibits.

With 5G, mobile networks can be optimized as features such as network slicing become available for both operators and enterprises deploying 5G network infrastructure. A network slice is a logical (i.e., virtual) network customized to serve a defined purpose, type/class of service, quality of services (QoS), or dedicated customers. A 5G network slice may be dynamically created consisting of an end-to-end composition of all the varied network resources and infrastructure needed to satisfy the specific performance requirements of a particular service class or application that may meet some pre-defined service level agreement (SLA). Each portion of the 5G network is respectively sliced such that the network can be viewed as being composed of RAN slices, mobile core slices, cloud slices, etc. 5G network slicing thus enables creation of multiple logical and secure networks that are isolated from each other, but which span over the same common physical network infrastructure.

5G network slices may consist of resources composed into an end-to-end service delivery construct. These may include physical resources, either a share or profile allocated to a slice, or dedicated physical resources in some cases. Slices also consist of logical entities such as configured network functions, management functions, VPNs (virtual private networks), etc. Resources (physical or logical) can be dedicated to a 5G network slice, i.e., separate instances, or they may be shared across multiple slices. These resources are not necessarily all produced within the mobile network provider as some may comprise services consumed from other providers, facilitating, for example, aggregation, cloud infrastructure, roaming, etc.

Figure 2:
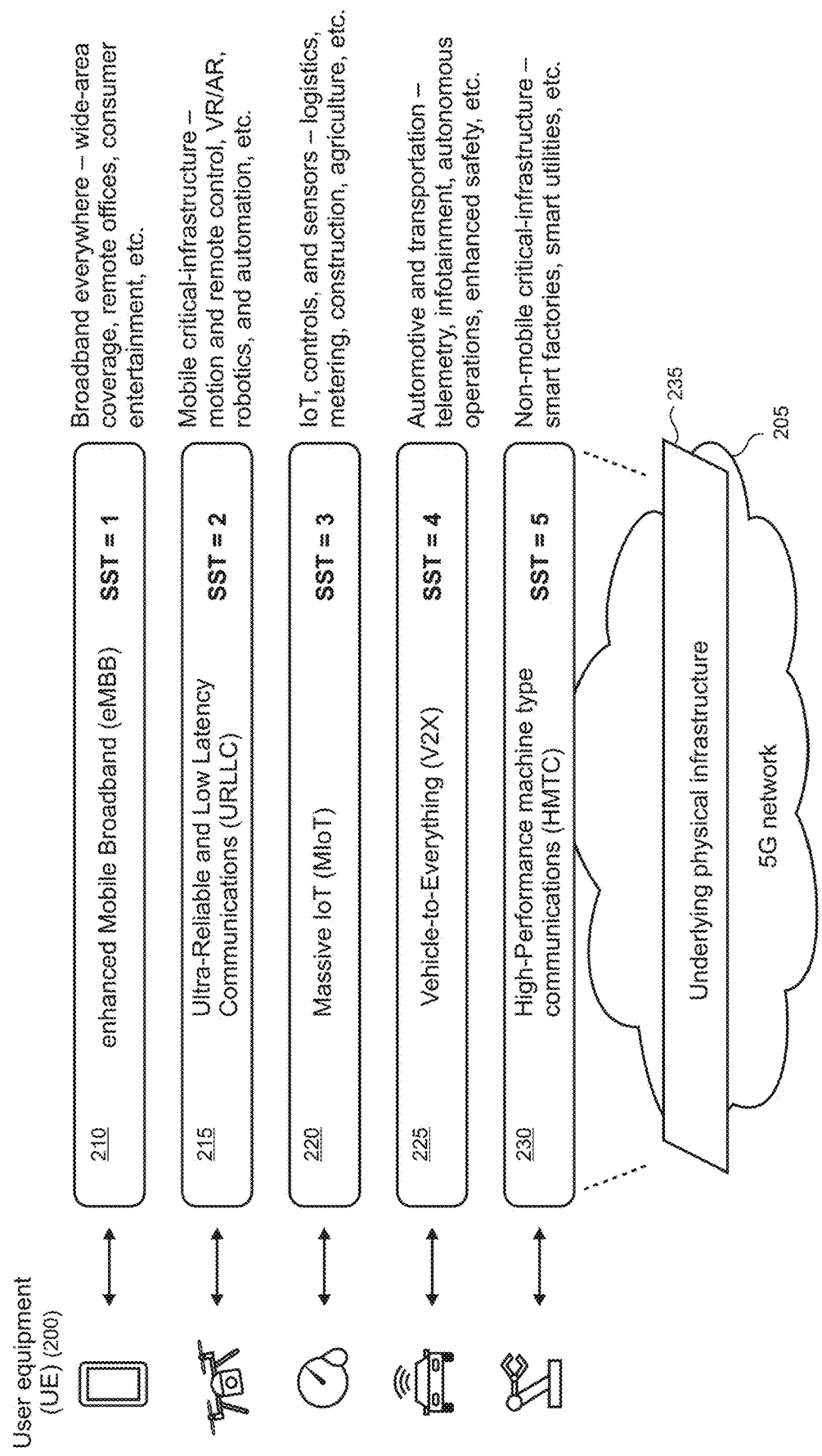
FIG. 2 shows illustrative standardized 5G network slices.

3GPP is the principal standards organization engaged in the architecture development for 5G. Several iterations of standards releases have established a foundation for the current phase of slice-specific definition. The 3GPP R15 System Architecture (3GPP TS 23.501) currently defines standard service-based Slice/Service types (SST). As shown in FIG. 2, the standardized 3GPP network slices of a 5G network 205 include eMBB (enhanced Mobile Broadband) (SST=1), URLLC (SST=2), and MIoT (SST=3) which correspond to the usage scenarios described by ITU-R 2083-0. Additional standardized SST values for V2X (Vehicle-to-Everything) (SST=4) and HMTC (High-Performance Machine Type Communications) (SST=5) are also defined by 3GPP. It may be appreciated that slice service types beyond those having standardized SST values can be defined.

The five standardized or pre-defined service types for 5G network slices are respectively indicated by reference numerals 210, 215, 220, 225, and 230 in FIG. 2. IMT-2020 describes the concept of network slicing as supporting a wide variety of requirements in UE and application services using a network where multiple logical network instances tailored to the requirements can be created. Network slicing allows the 5G network operator to provide dedicated logical networks (i.e., network slices) with customer specific functionality. The 5G architecture enables different network configurations in different network slices.

A network slice can be dedicated to different types of services and can span all the domains of the underlying physical infrastructure 235, such as the transport network supporting flexible locations of functions, dedicated radio configurations or specific radio access technologies (RATs), and the mobile core network. Network slices can also be deployed across multiple operators. Slices can share common physical infrastructure or may have dedicated resources and/or functions in some cases. Different types of network slices can be composed of not only standardized network functions but also some proprietary functions that may be provided by different operators or third parties.

Standardized SST values and pre-defined slice types provide a way for establishing global interoperability for 5G network slicing so that operators can efficiently support key industry verticals—for example, industrial automation, healthcare, entertainment, transportation, manufacturing, energy, agriculture, construction, security, etc.—for the most commonly used pre-defined Slice/Service Types. Additional customization and/or specialization for applications and services may be implemented for specific usage scenarios. A UE may provide Network Slice Selection Assistance Information (NSSAI) parameters to the network to help it select a RAN and a core network part of a slice instance for the device. A single NSSAI may lead to the selection of several slices. NSSAI consists of Session Management NSSAIs (SM-NSSAI), which each include an SST and possibly a Slice Differentiator (SD). SST may refer to an expected network behavior in terms of features, e.g., broadband or IoT, while the SD can help in the selection among several slice instances of the same type. It is noted that services supported in a standardized pre-defined slice may also be supported by other pre-defined slices having other (i.e., non-standard) SST values.

FIG. 2 shows user equipment (UE) 200 that may be representative of the wide variety of device types that may utilize 5G networking including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. The standardized slices can be respectively mapped to such UE types in typical usage scenarios to optimize network utilization and user experiences, but 5G network slicing is designed for flexibility to meet demand across a wide spectrum of device types and diverse applications and services. The network softwarization provided by SDN and NFV paradigms in 5G enables network slice configuration (i.e., how various physical infrastructure and network resources are deployed) to be rapidly and dynamically adapted to ensure that performance objectives are continuously met for 5G applications across a given population of UEs.

As shown, the configuration of eMBB slice 210 may be optimized for broadband-everywhere usage scenarios across a wide coverage area for applications such as consumer entertainment (e.g., video, gaming, streaming), remote offices, etc., where maximized network speeds and data rates are desired and high traffic volumes are typically experienced. The URLLC slice 215 may be configured for mobile critical-infrastructure low-latency usage scenarios including applications such as remote control operations in medical and industrial environments, VR and AR, robotics and automation, etc.

The MIoT slice 220 may be configured for optimal handling of IoT, control, and sensor applications relating to logistics, construction, and metering in vertical industries such as construction and agriculture. The V2X slice 225 may be optimized for automotive and transportation applications such as telemetry, infotainment, autonomous operations, enhanced safety, and the like. The HMTC slice 230 is typically configured for optimal handling of non-mobile/fixed critical-infrastructure applications such as smart factories, smart utilities, etc.

Figure 3:
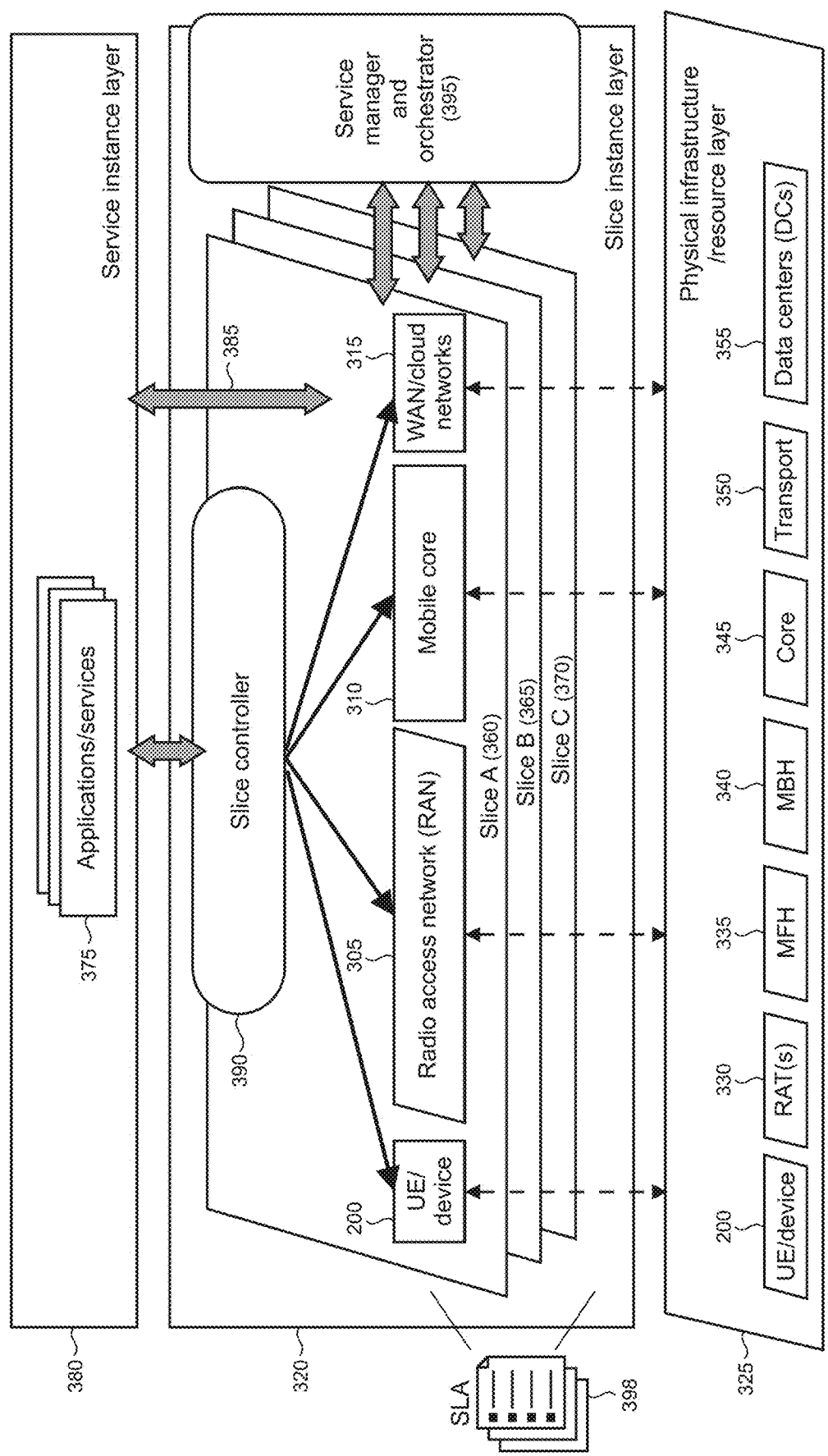
FIG. 3 shows an illustrative layered 5G network slicing framework.

FIG. 3 shows an illustrative layered 5G network slicing framework 300 that is described in the IMT-2020 recommendation. The framework comprises a RAN 305, mobile packet core 310, and cloud networking components 315 that are logically represented in a network slice instance layer 320 that sits above a physical infrastructure layer 325 in the framework. The physical infrastructure layer provides an abstraction of radio, compute, network, and storage resources which may include, for example, one or more RATs 330, mobile fronthaul (MFH) 335, mobile backhaul (MBH) 340, mobile core network 345, transport 350, and one or more datacenters (DCs) 355. In some cases, one or more UE instances may be implemented as resources.

In this illustrative example, the slice instance layer includes three 5G network slices—Slice A 360, Slice B 365, and Slice C 370, but more or fewer slices may be utilized in any given implementation at any given time. These slices may include one or more of the pre-defined slice types shown in FIG. 2 and described in the accompanying text or comprise different slice types.

Slices may be isolated by logically or physically isolating their underlying resources. The slices can support instances of various applications and/or services (collectively indicated by reference numeral 375) in a service instance layer 380, for example, using an application programming interface (API), as representatively indicated by reference numeral 385. Each network slice may be viewed as an independent logical collection of resources which can dynamically vary in configuration from slice to slice as needed to meet pre-defined technical characteristics (e.g., throughput, latency, reliability, etc.) and/or business characteristics as required by an application/service instance.

A slice controller 390 is utilized with the slicing framework 300 to maintain awareness of the application requirements to responsively allocate and manage the virtualized network functions and resources in each slice. A service manager and orchestrator 395 combines the necessary resources and functions to produce a network slice instance. Its main tasks include creation of slice instances upon the underlying physical infrastructure, dynamically mapping network functions to slice instances to meet changing context and maintain communication between the application and services and the framework to manage slice lifecycle.

As shown, a service level agreement (SLA) 398 is typically applicable to each of the slices 360, 365, and 370. The applicable SLAs can vary in scope and composition. The slice controller 390 may be advantageously utilized to perform resource allocation among RAN slices to meet the connectivity requirements while ensuring compliance with applicable SLA guarantees in some cases.

An SLA may be defined as a contract between the provider of a service and its internal or external end-user or customer that defines what services the provider will offer and the level of performance it must meet as well as any remedies or penalties should the agreed-upon levels not be realized. According to the ITU, an "SLA is a formal agreement between two or more entities that is reached after a negotiating activity with the scope to assess service characteristics, responsibilities and priorities of every part." SLAs typically establish customer expectations for a provider's performance and quality. Various types of customers can be supported by the present automated recovery of far edge infrastructure in a 5G network, typically depending on applicable circumstances and context. For example, customers may include, but are not limited to consumers, businesses, enterprises, organizations, service providers, application developers, and the like. A 5G network operator may support its own services to customers as well as services from multiple different third-party providers. For example, one third-party provider may offer services to customers on one particular network slice while another third-party provider offers services on another network slice. Each discrete service offering may have its own corresponding distinct SLA.

SLA terms may include metrics covering technical aspects of service, for example describing a level and volume of communication services and which measure the performance characteristics of a provided service. Such technical metrics may include but not be limited to, for example, availability, throughput, latency, bit/packet error rate, and energy. SLAs may also include business, economic, and legal terms covering the agreement between the service provider and the customer. SLAs for different service and slice types can vary. For example, some slice types have more elasticity with regard to RAN resource allocation where resources can be readily adjusted depending on resource demand. Other slice types may be more inelastic. For example, the URLLC slice type may require strict resource allocation to guarantee reliability and low latency under a corresponding SLA, while enhanced MBB resources may be readily scaled downward once the edge cloud buffering is complete.

Figure 4:
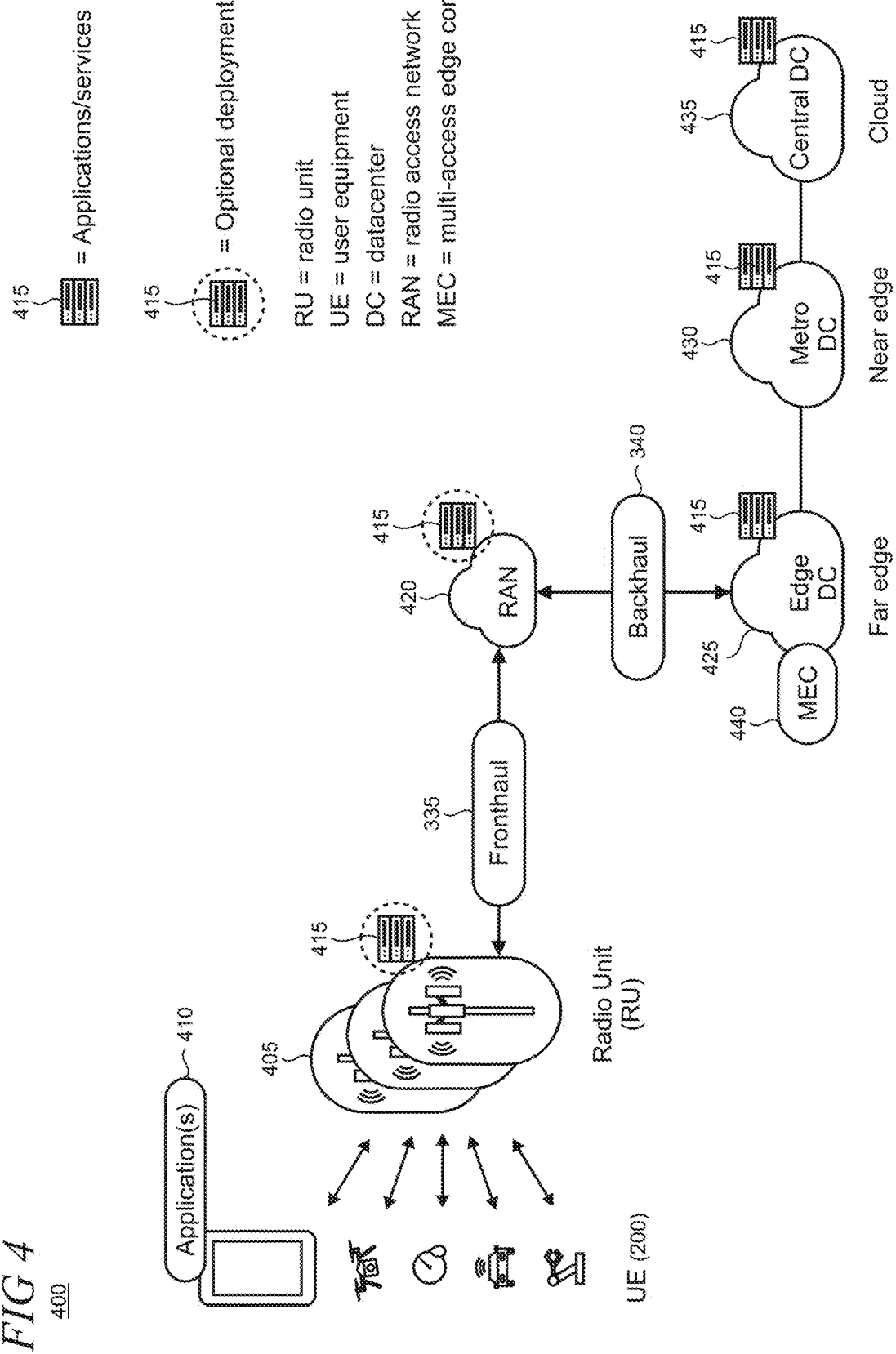
FIG. 4 shows illustrative physical infrastructure in a 5G network architecture.

FIG. 4 shows illustrative physical infrastructure in a 5G network 400. Multiple instances of a radio unit (RU) 405 are configured to interact with a diverse population of UE 200. Each UE typically includes one or more local applications 410 or client-side software/firmware components that may be arranged to interface with one or more remote application servers, service providers, or other resources (collectively indicated by reference numeral 415) and thus require network connectivity to such remote facilities.

The RUs are coupled by the mobile fronthaul 335 to a RAN 420. The RAN is coupled by the mobile backhaul 340 to one or more datacenters (DCs). In this illustrative example, the DCs comprise an edge DC 425, a metro DC 430, and a central DC 435. In some networking literature, the edge DC may be referred to as a far edge DC. The metro DC may be referred to as a near edge DC, and the central DC may be referred to as the cloud. In some implementations, the far edge DC may support multi-access edge computing (MEC) functions 440.

The application servers 415 can be located at various points in the network architecture 400 to meet technical requirements and traffic demands. Typically, the application servers will be physically located closer to the UE 200 in cases where latency is sought to be minimized. However, an operator's application server location criteria may also consider factors such as management ease, scalability, and security, among other factors. In some implementations, an operator may optionally deploy application servers and other resources in the RAN 420 or RU 405, as indicated by the dashed circles in FIG. 4.

Figure 5:
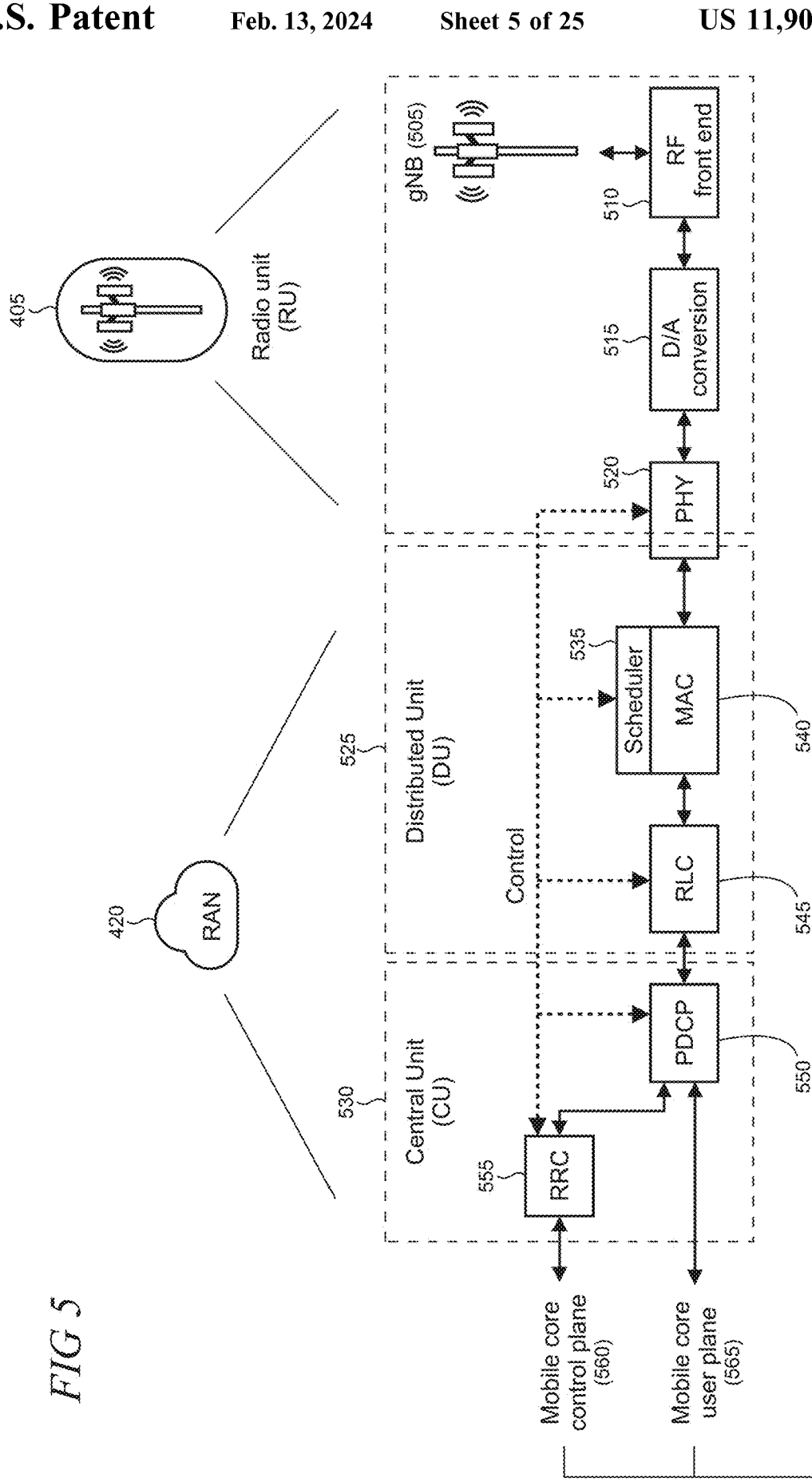
FIG. 5 shows an illustrative 5G radio access network (RAN) and radio unit (RU)

FIG. 5 shows functional blocks of the RAN 420 and RU 405. The RU comprises radio transmission points, for example, a next generation Node B, gNB 505, which handles radio communications with the UE. The gNB is serially coupled to a radio frequency (RF) front end 510, a digital to analog (D/A) conversion unit 515, and a portion of the functionality of the physical (PHY) layer 520 as described in the OSI Open Systems Interconnection model.

Under 3GPP and O-RAN (Open RAN) Alliance, the processing pipeline of the RAN 420 is split into a distributed unit (DU) 525, and a central unit (CU) 530. The DU is responsible for real-time layers 1 and 2 (L1 and L2) scheduling functions, and the CU is responsible for non-real-time, higher L2 and L3 functions. Accordingly, the DU comprises a scheduler 535 located on top of a MAC (Medium Access Control) layer component 540, an RLC (radio link control) layer component 545, and parts of a PHY (physical) layer component 520. The MAC layer component is responsible for buffering, multiplexing, and demultiplexing segments, including all real-time scheduling decisions about which segments are transmitted when. It is also able to make a "late" forwarding decision (i.e., to alternative carrier frequencies, including Wi-Fi, for example). The PHY layer component is responsible for coding and modulation.

The CU 530 is configured with a PDCP (Packet Data Convergence Protocol) layer component 550 and RRC (Radio Resource Control) layer component 555. The PDCP layer component is responsible for compressing and decompressing IP headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the control plane 560 while the PDCP layer component interfaces with the user plane 565 to thereby implement the "CUPS" feature of 5G (control and user plane separation).

Figure 6:
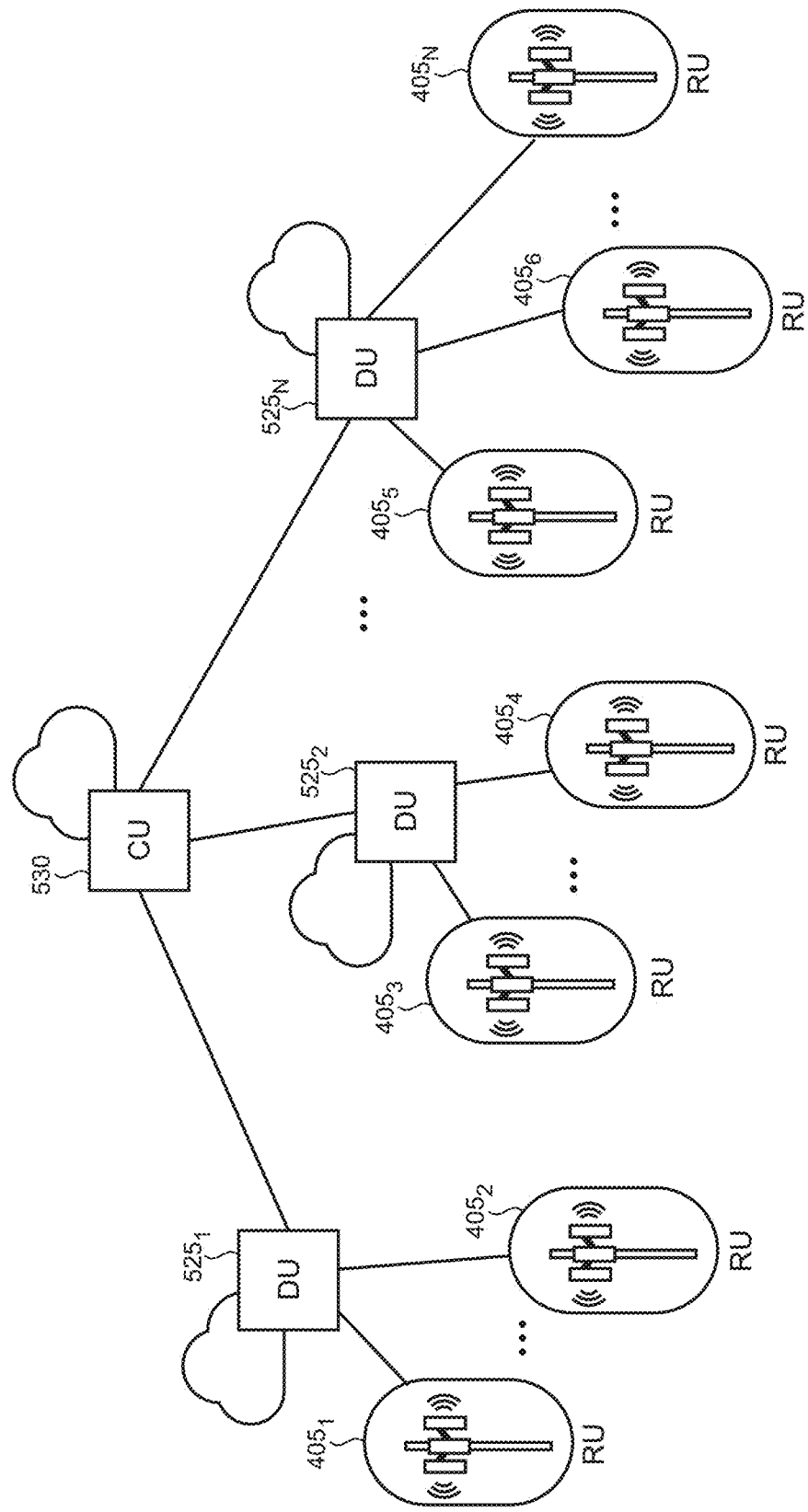
FIG. 6 shows an illustrative split-RAN hierarchy in which a central unit (CU) may support multiple distributed units (DUs) which, in turn, may support multiple RUs.

The split-RAN configuration shown in FIG. 5 enables RAN functionality to be split among physical infrastructure elements in centralized and distributed locations. For example, as shown in FIG. 6, a single CU 530 may be configured to serve multiple DUs 525, each of which in turn serves multiple RUs 405.

Figure 7:
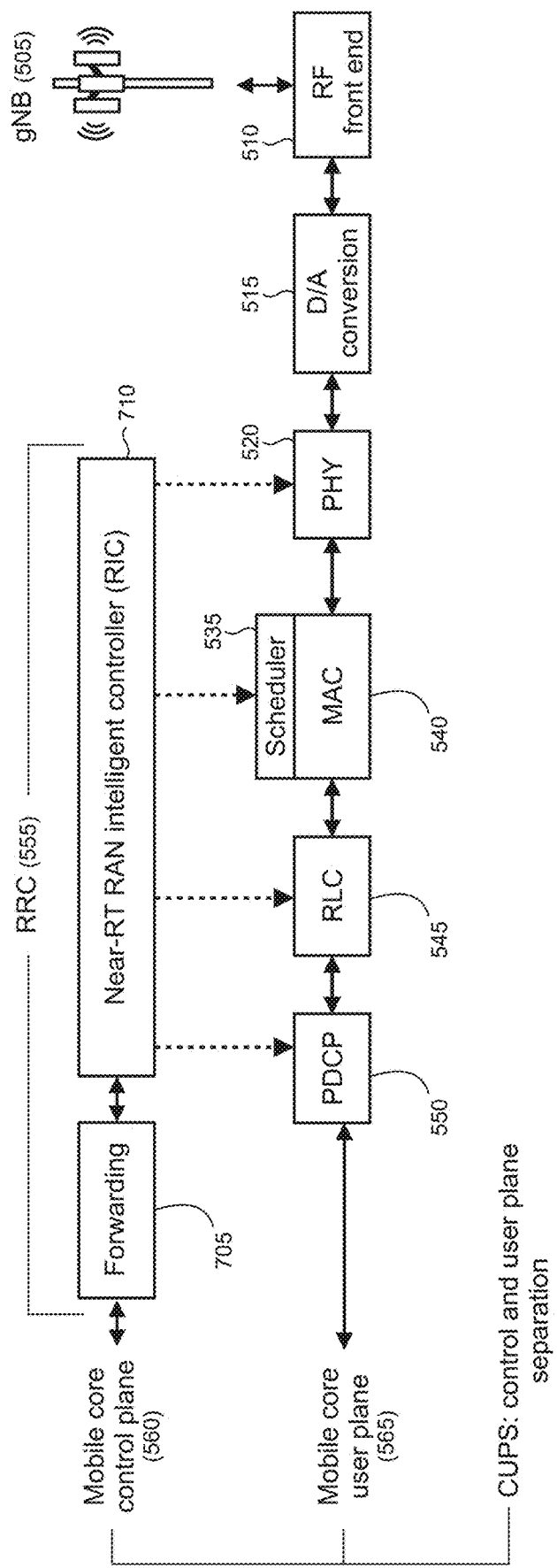
FIG. 7 shows an illustrative radio resource control (RRC) that is disaggregated into a mobile core-facing control plane component and a near-real-time RAN intelligent controller (near-RT RIC)

FIG. 7 shows that the RRC layer component 555 may be disaggregated into a mobile core-facing control plane forwarding component 705 and a near-real-time (RT) controller RAN intelligent controller (RIC) 710. The RRC layer component is thus responsible for only near-real-time configuration and control decision making, while the scheduler 535 on the MAC component 540 is responsible for real-time scheduling decisions.

Figure 8:
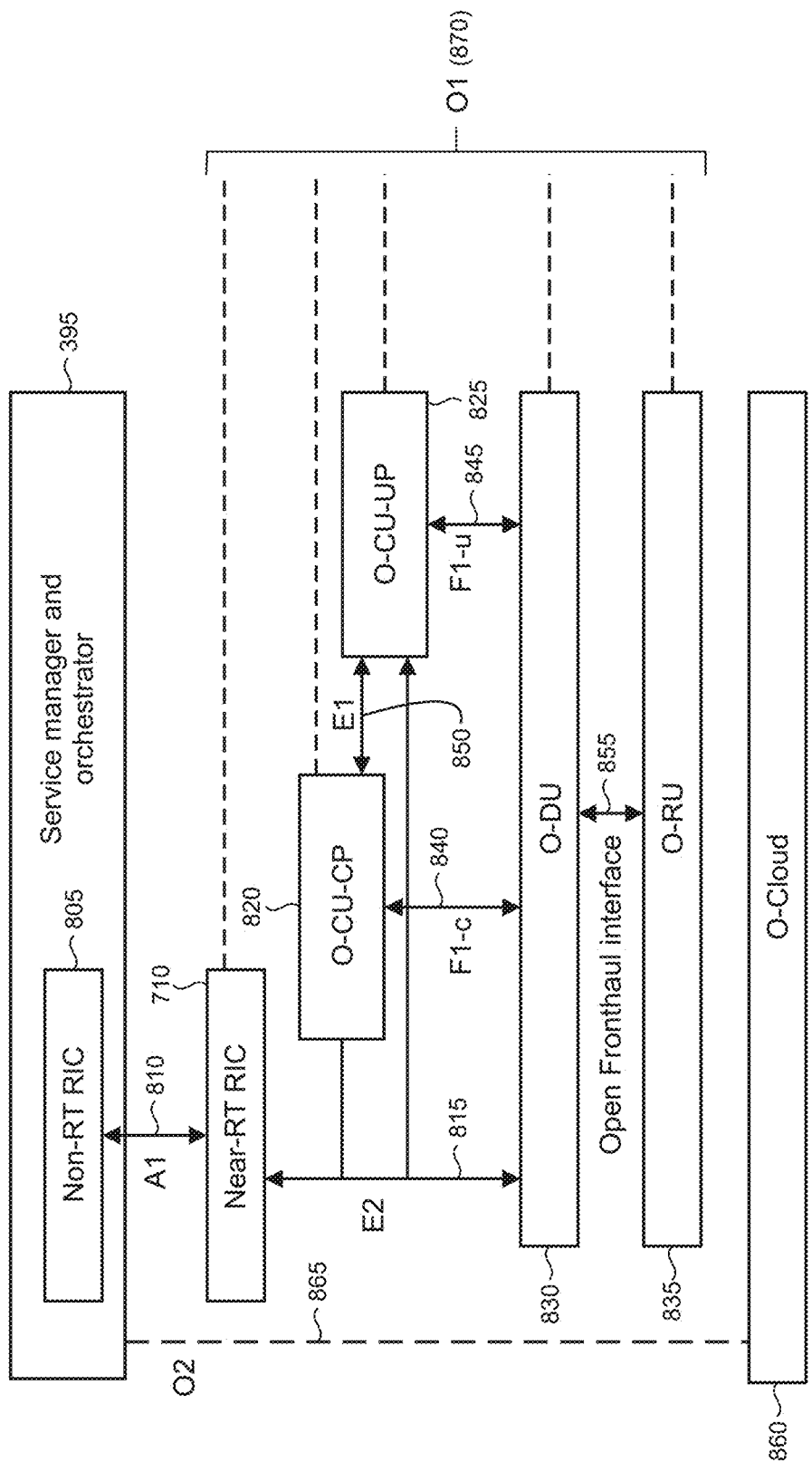
FIG. 8 shows an illustrative RAN operations and maintenance (OAM) logical architecture as described by the O-RAN Alliance.

FIG. 8 shows an illustrative RAN operations and maintenance (OAM) logical architecture 800, as described by the O-RAN Alliance. In the drawing, the "O" prefix indicates the O-RAN implementation for the functional elements of the architecture. The O-RAN Alliance defines and maintains the A1, E2, O1, O2, and Open Fronthaul interfaces discussed below. As shown, a non-RT RIC 805 may be incorporated into the service manager and orchestrator 395. The non-RT RIC interoperates with a near-RT MC 710 through an A1 interface 810.

The near-RT MC 710 is coupled over an E2 interface 815 with network functions for radio access for control and optimization including the O-CU-CP (O-RAN Central Unit-Control Plane) 820, O-CU-UP (O-RAN Central Unit-User Plane) 825, and O-DU 830. The O-CU-CP and O-CU-UP are respectively coupled to the O-DU over F1-c and F1-u interfaces, 840 and 845, as defined and maintained by 3GPP.

The O-CU-CP is coupled to the O-CU-UP over a 3GPP E1 interface 850. The O-DU and O-RU 835 are coupled using an Open Fronthaul interface 855 (also known as the lower layer split (LLS) interface).

The O-Cloud 860 is a cloud computing platform comprising a collection of physical infrastructure nodes that meet O-RAN requirements to host the relevant O-RAN functions (i.e., near-RT RIC, O-CU-CP, O-CU-UP, and O-DU), the supporting software components (such as Operating System, Virtual Machine Monitor, Container Runtime, etc.), and the appropriate management and orchestration functions to create virtual network instances and map network functions. The O-Cloud is coupled to the service manager and orchestrator 395 over the O2 interface 865. An O1 interface 870 is provided to each of the near-RT MC, O-CU-CP, O-CU-UP, O-DU, and O-RU, as shown in FIG. 8.

Figure 9:
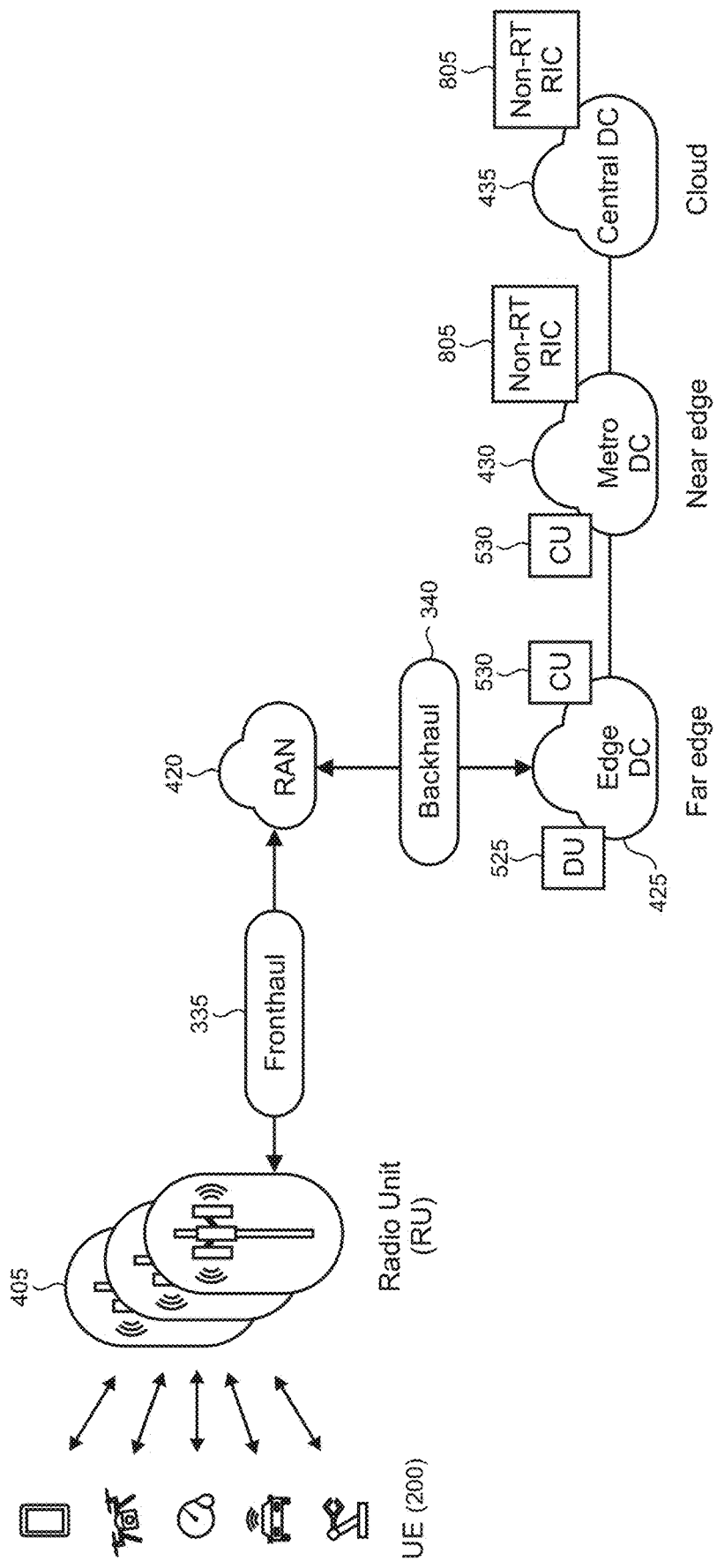
FIG. 9 shows an illustrative 5G network implementation in which split-RAN functional units and instances of the non-real-time RIC (non-RT RIC) may be distributed among physical infrastructure components.

The splitting of functional elements among the DU, CU, near-RT RIC, and non-RT RIC, as discussed above, enables flexible deployment of instances of such elements in the physical infrastructure that underlies a typical 5G network. FIG. 9 shows an illustrative implementation in which split-RAN functional units and instances of the non-RT RIC may be distributed among physical infrastructure components of a 5G network 400. For example, as shown, a DU 525 and CU 530 may be located at the edge DC 425. A CU 530 and non-RT RIC 805 may be located in the metro DC 430. The central DC 435 can also host a non-RT RIC in some cases.

Figure 10:
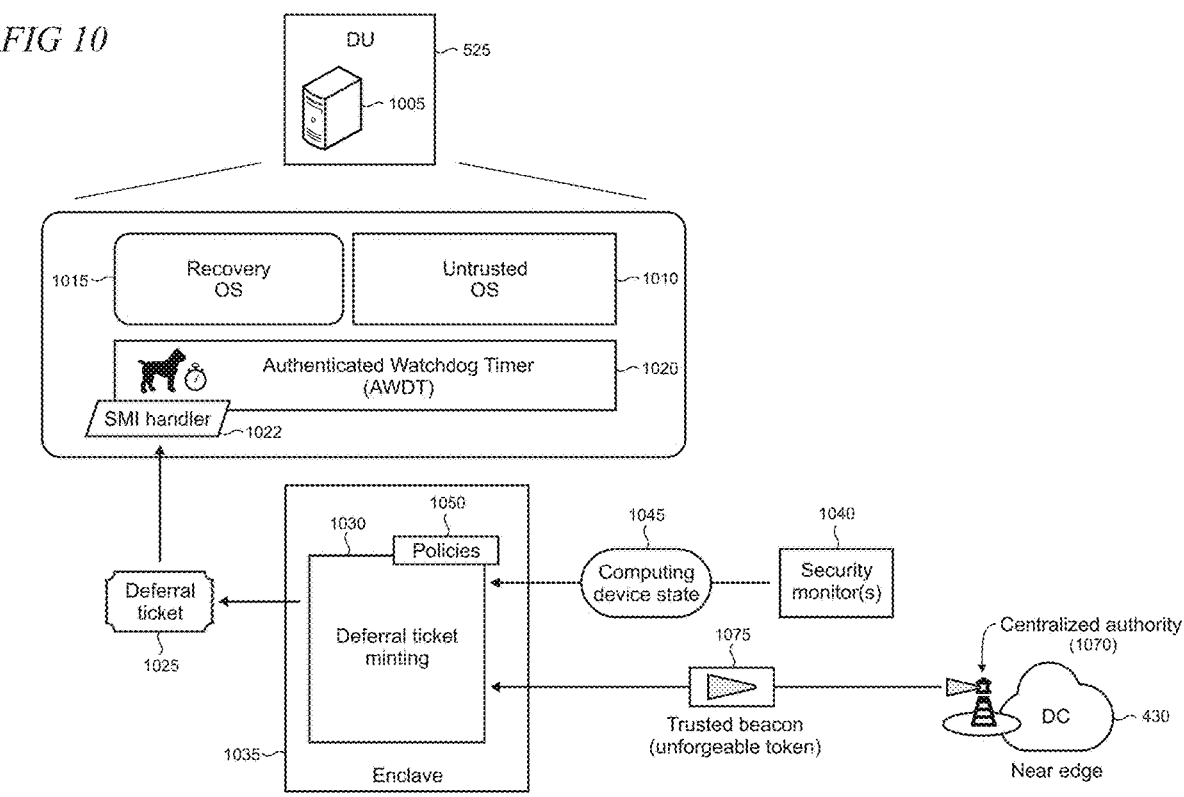
FIG. 10 shows illustrative components that may be utilized in one or more computing devices in a DU of an exemplary RAN.

FIG. 10 shows illustrative components that may be utilized in one or more computing devices 1005, such as computer servers, in a DU 525. As noted above, the DU may be located in far edge 5G network infrastructure of a RAN, such as RAN 420 (FIG. 4) and can utilize commodity-type equipment commonly known as commercial off-the-shelf ("COTS"). It is noted that the DU example shown and described in FIG. 10 is intended to be illustrative, and the principles and techniques described herein for automated recovery of 5G network infrastructure may be applied to other computing devices that are deployed at various locations in a given 5G network. For example, the present automated recovery principles can be utilized in computing devices at the CU 530 (FIG. 5) or RU 405 in some cases. The present principles can also be applied to computing devices in datacenters (e.g., DCs 425, 430, and/or 435 in FIG. 4) to supplement or replace interventions by technical personnel.

In conventional use scenarios, operators face additional costs in dealing with attacks on far edge 5G network infrastructure which is typically disaggregated and distributed across diverse physical geographies. Recovery of computing devices that fail or are maliciously compromised may include efforts by technical personnel in the field to reboot and re-image a device back to a known good state. Other recovery techniques can be implemented, using a central management server for example, that provide satisfactory performance in many applications. However, such techniques may be susceptible to malicious actors severing the connection between the central management server and the remote computing devices in the far edge to thereby limit the operator's remote control of the infrastructure. The present recovery model and techniques disclosed herein enable far edge 5G network infrastructure to be recovered from software failures and/or malicious attacks in an automated manner that is fully locally-implemented without requiring either on-site personnel or remote control actions.

The present principles may also be advantageously utilized to recover from ransomware attacks. Ransomware attackers typically encrypt a victim's data and demand a ransom to decrypt it. However, modern ransomware attacks do not limit themselves to encrypting the data. Such ransomware attacks instead remove an enterprise's ability to control their platforms and critical infrastructure such as the RAN portion of a 5G network. The distributed nature of 5G network infrastructure adds complexity to recovery efforts to regain control of the RAN.

In this illustrative example, the computing device 1005 comprises one or more processors in the x86 family, however, it will be appreciated that the principles described herein may be applicable to other processor families with suitable modifications and/or secure execution environments supported on other computing platforms. The computing device may include a commodity operating system OS 1010 that is untrusted. A recovery OS 1015 resides in a read-only disk partition where the read-only property is hardware-enforced, thus isolating it from the untrusted OS.

The computing device 1005 supports an authenticated watchdog timer (AWDT) 1020 that is configured to cause the computing device to reboot and re-image from the recovery OS 1015 when it counts down to some predetermined value (e.g., zero). The starting value of the timer can vary by implementation. The AWDT may be implemented in software (e.g., firmware), hardware, or a combination of software and hardware. The execution of the AWDT is protected so that other software and processes on the computing device cannot interfere or disrupt the countdown of the timer. Accordingly, the AWDT implements trusted processes that may be protected from attack using one or more of execution protection, memory protection, and the like.

In this illustrative example, the AWDT may be configured using code that executes in System Management Mode (SMM). SMM is a special privileged x86 processor execution mode which provides an SMI handler 1022 as a service that may communicate information to a service consumer during OS runtime. The SMI handler can be programmed to execute periodically, effectively implementing a timer that counts down, for example, to zero. In other applications, the AWDT may execute on or be implemented using a separate processor from the main processors of the computing device (e.g., the processors that execute the operating system and applications), may execute on the main processors as a separate process, or may be a regular process executing on the main processors of the computing device 1005.

The AWDT 1020 may be reset, so that the timer is incremented upwards to thereby delay the reboot and re-imaging, with a single-use deferral ticket 1025 produced on the computing device 1005 using a locally-executing deferral ticket minting process 1030. In this illustrative example, the minting process may execute in a secure runtime environment such as a trusted SGX enclave 1035 that is instantiated on the computing device. Other secure runtime environments can include a virtual machine protected by AMD SEV (Secure Encrypted Virtualization), or an ARM Trust-Zone environment. The computing device may be configured to interface with one or more security monitors 1040 that are arranged to collect and report various data 1045 dealing with the state of the computing device. The security monitors may be implemented using trusted and/or secure processes and/or hardware. For example, the security monitors may execute in an SGX enclave using a hardware-enforced isolated address space.

For example, the security monitors 1040 can be internal or external to the computing device 1005 and configured to continuously collect state data 1045 that is pertinent to the configuration and operations of the device and/or the DU 525 or RAN 420 more generally. Typically, the monitored state data may be utilized by the deferral ticket minting enclave 1030 to perform security and integrity checks of the far edge 5G network infrastructure by applying policies 1050 or other rules that set predetermined thresholds of runtime integrity that need to be maintained to defer reboot. The policies may consider a number of factors to determine that the monitored systems are sufficiently healthy to defer reboot. Such factors may include, for example, software versions that are running, computing device behaviors and utilization of resources (e.g., network, storage, and compute resources), the time elapsed since last reboot, detection of known malware, and the like.

The computing device 1005 may be configured to interface with a trusted centralized authority 1070 such as a cloud provider DC, as illustratively shown in FIG. 10, or other centralized management arrangement. In this illustrative example, the centralized authority is implemented in a near edge DC 430, but central and far edge DCs may also be used in some embodiments of the present automated recovery. The centralized authority may be arranged to produce trusted beacons 1075—unforgeable tokens that are signed by centralized authority—that deem the computing device as operational in a good state. The deferral ticket minting enclave 1030 may utilize the trusted beacon from the centralized authority in ticket minting decision-making processes, as described below in the text accompanying FIG. 18.

Figure 11:
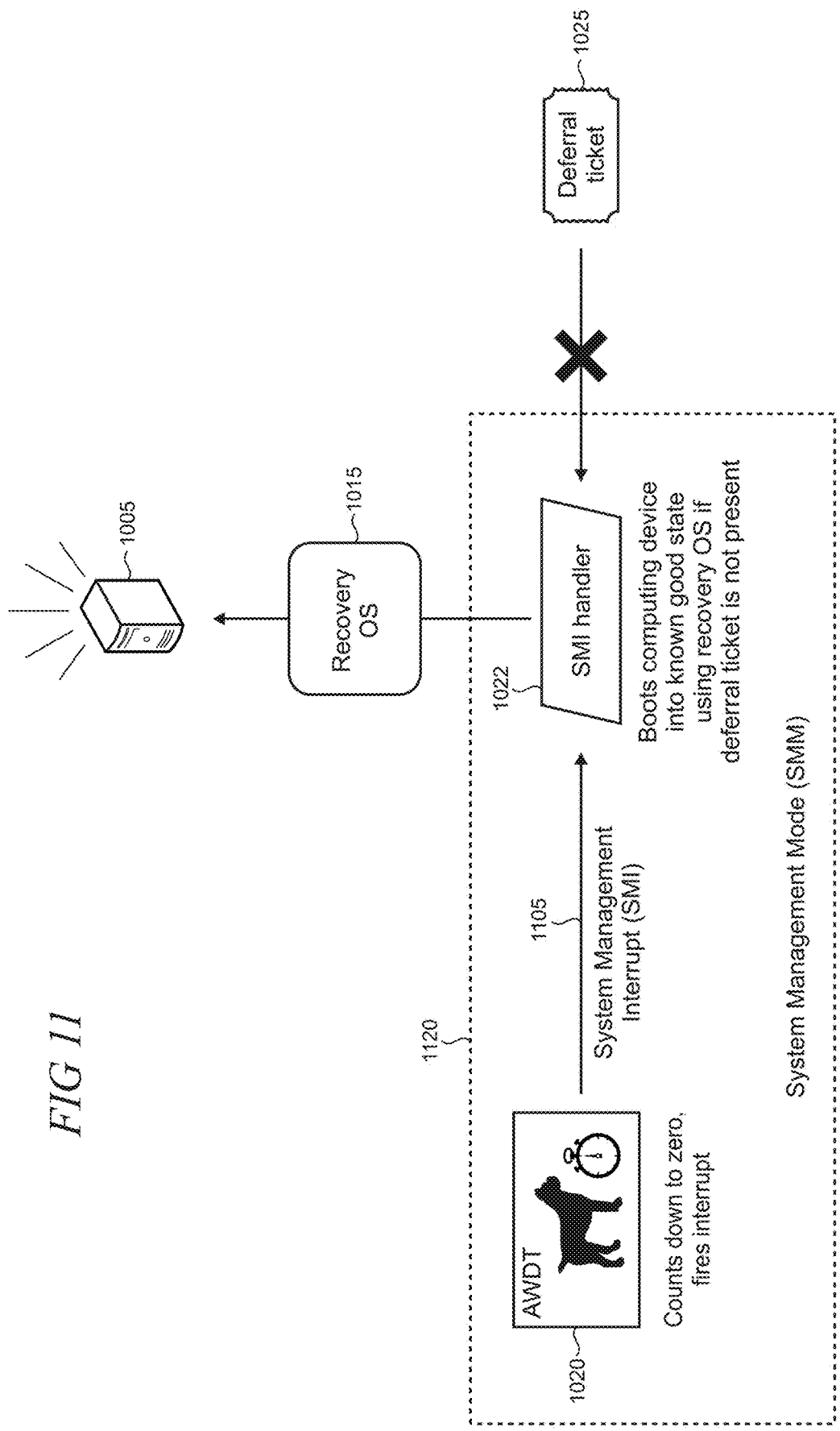
FIG. 11 shows an authenticated watchdog timer (AWDT) that is configured to fire an interrupt in System Management Mode (SMM) to boot a computing device into a known good state from a recovery operating system (OS)

As shown in FIG. 11, if the AWDT 1020 is not reset by a deferral ticket 1025, it will count down to a predetermined value at which the next SMI 1105 is fired and the SMI handler 1022 will force a reboot and re-image of the computing device 1005. The SMI is received by the SMI handler to initiate a process to reboot and re-image the computing device 1005 from the recovery OS 1015 to a known good state (shown in FIG. 11 as a "golden state" and indicated by reference numeral 1115). Such reboot and re-imaging processes advantageously provide a capability to the computing device to unconditionally recover to a known good state within some finite time interval even in the presence of an active root-level adversary. As indicated by the dashed line 1120, the AWDT 1020 and SMI handler 1022 may operate in SMM.

Figure 12:
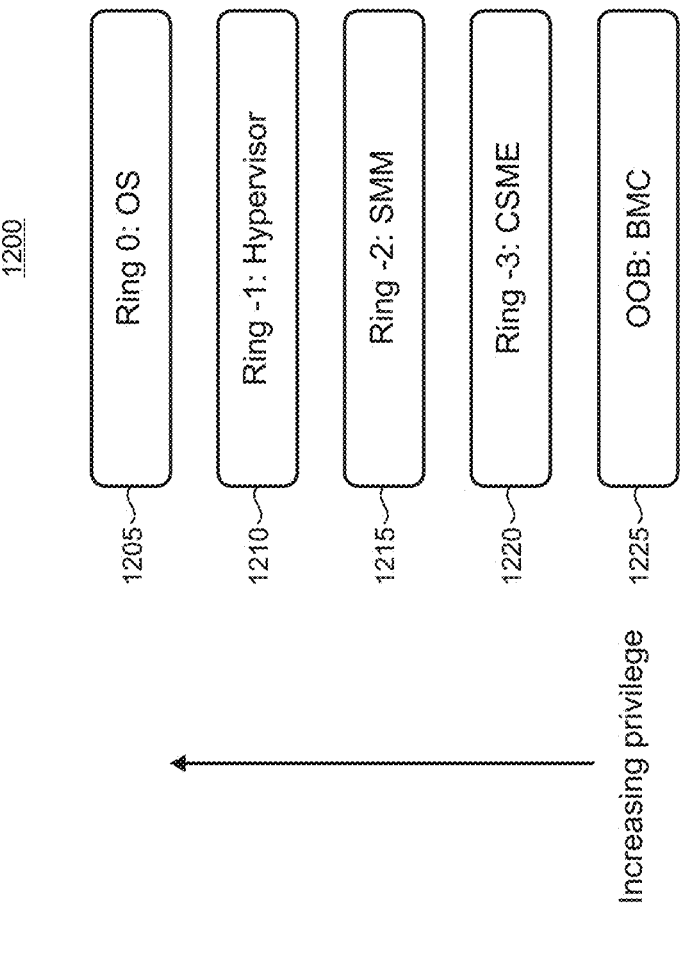
FIG. 12 shows an illustrative hierarchy of protection domains.

FIG. 12 shows an illustrative hierarchy 1200 of ordered protection domains that are utilized in the x86 processor architecture with the highest level of privilege at the top. As shown, the OS runs in Ring 0 (as indicated by reference numeral 1205), followed by the Hypervisor in Ring −1 (1210). In Ring −2 (1215), SMM is typically used by original equipment manufacturers (OEMs) of computing devices to interact with hardware like non-volatile RAM (random access memory), emulate hardware functionality, handle hardware interrupts or errata, and perform other functions. SMM runs in the form of interrupt handlers that are triggered by timers or access to certain memory, registers, or hardware resources. OEM drivers and runtime firmware services may explicitly trap SMM to control certain hardware functionality. The processor runs SMM code in a separate address space and has access to System Management RAM (SMRAM) that enjoys special hardware protection that prevents less privileged software from accessing SMM code. While the OS and even the hypervisor may be compromised by malware/ransomware, the SMM remains trusted and can perform the present automated recovery processes.

Ring −3 (1220) supports a Converged Management Security Engine (CSME) comprising an isolated 32-bit processor that runs as an embedded subsystem. On x86 processors, CSME is locked down by the CPU (central processing unit)

vendor, such as Intel. Below Ring −3 in the hierarchy 1200 is an out-of-band (OOB) (1225) layer comprising a Baseboard Management Controller (BMC) that runs in a separate processor using Linux that can communicate with the host processor on the computing device. BMC is commonly utilized to manage datacenter servers remotely. The present automated recovery principles may be implemented using servers and computing platforms at the far edge that are often not equipped with BMCs.

Using SMM in Ring −2 for the AWDT 1020 (FIG. 10) advantageously avoids potential issues with implementation in the OS or hypervisor in COTS hardware that could become compromised with malware. The SMM implementation also provides greater extensibility across OEMs compared to BMC and CSME. In addition, utilization of SMM minimizes the trusted computing base of the present automated recovery solution relative to those using hypervisor, BMC, or CSME which expose larger attack surfaces.

Figure 13:
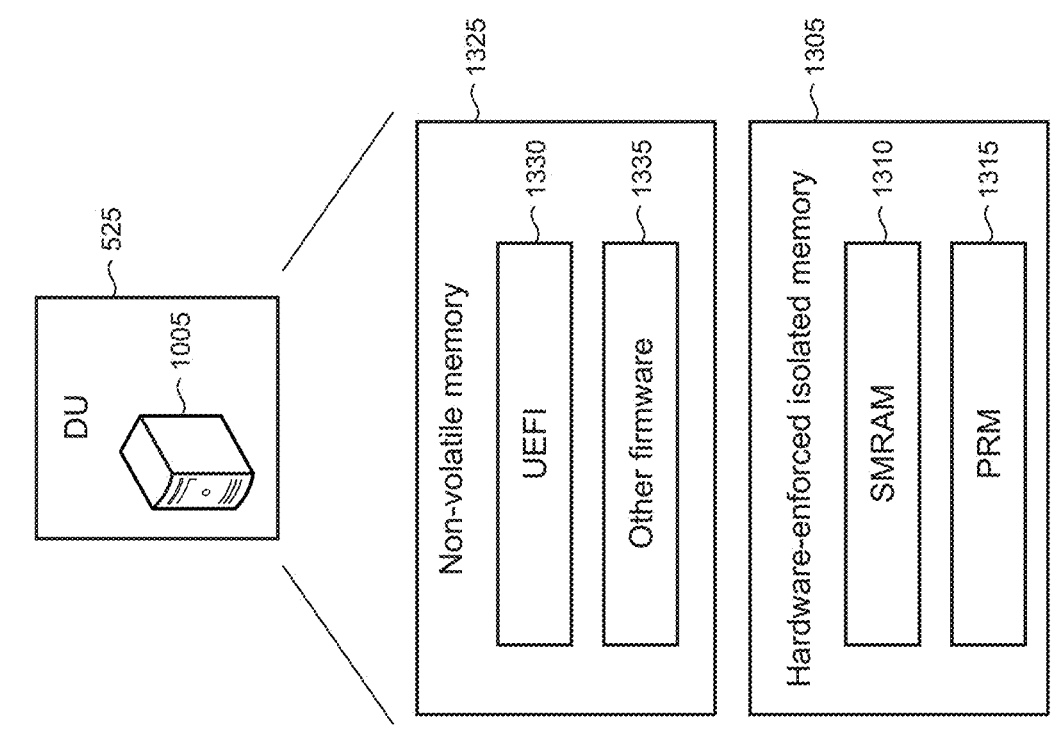
FIG. 13 shows illustrative memory resources of a computing device in a DU of an exemplary RAN.

FIG. 13 shows illustrative memory resources of a computing device 1005 in the DU 525. As noted above, the SMM has access to an area of hardware-enforced isolated memory 1305 referred to as SMRAM 1310. SGX enclaves, such as the deferral ticket minting enclave 1035 (FIG. 10), utilize Processor Reserved Memory (PRM) (1315) which provides hardware-enforced isolation from software running outside the enclave to prevent it from accessing memory that does not belong to it. Specifically, non-enclave software is only allowed to access memory outside the PRM range, while the code inside an enclave is allowed to access non-PRM memory, and the parts of PRM (i.e., enclave page cache (EPC) pages) that are owned by that enclave.

In addition to the SMRAM 1310 and PRM 1315 that are implemented using dynamic RAM (DRAM), the computing device 1005 includes non-volatile (i.e., flash) memory 1325 that stores a signed copy of the Unified Extensible Firmware Interface (UEFI) firmware 1330 that contains boot code and the code that executes in SMM. To load this firmware, a secure boot process validates the signature of the firmware stored on flash. This ensures that modified firmware is not being loaded on the platform. Other non-UEFI firmware 1335 may also be utilized by the computing device in some cases.

Figure 14:
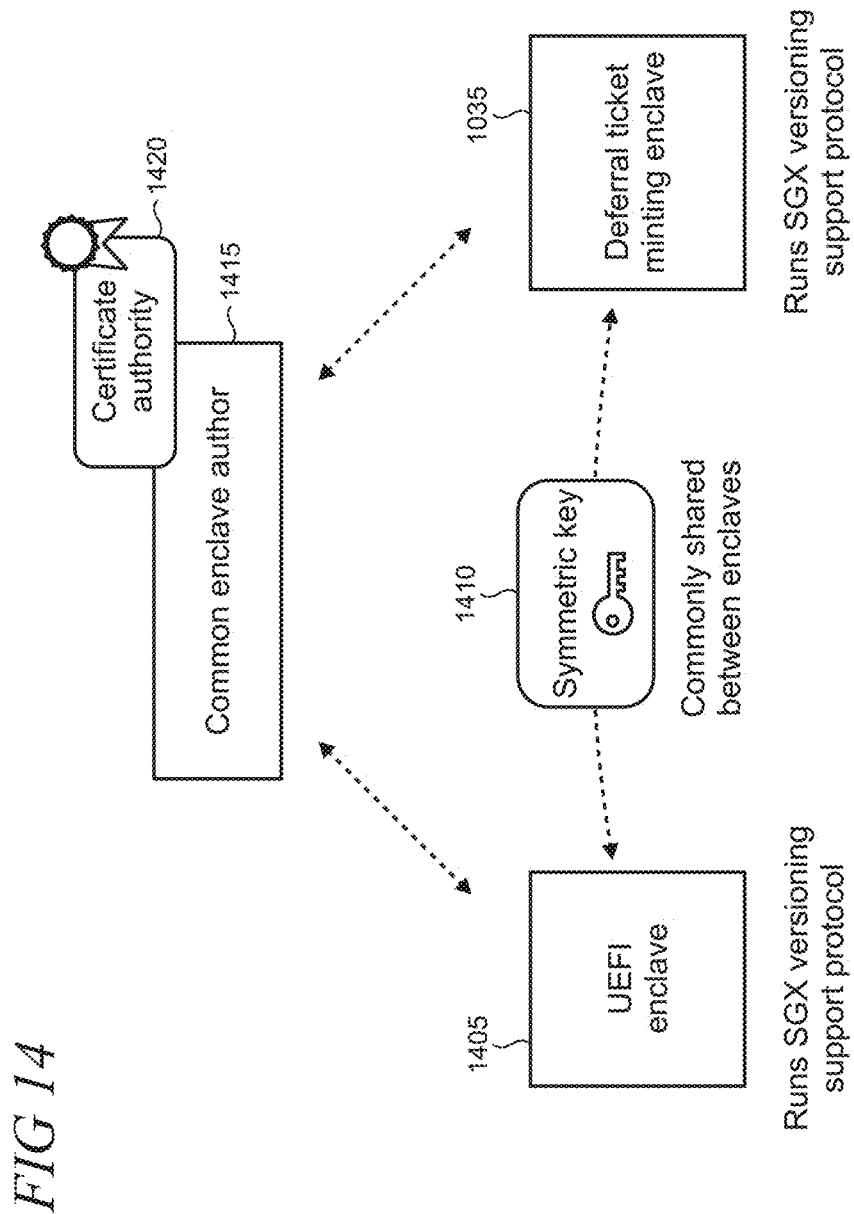
FIG. 14 shows a symmetric key that may be commonly shared between enclaves that have the same enclave author.

Execution of the UEFI code enables initialization of a UEFI enclave 1405 that facilitates creation of a symmetric key 1410 shared between the UEFI enclave and the deferral ticket minting enclave 1035, as shown in FIG. 14. Such provisioning of a common symmetric key is enabled for SGX enclaves using a one-level certificate hierarchy in which the common author 1415 for each enclave is a Certificate Authority (CA) 1420.

Figure 15:
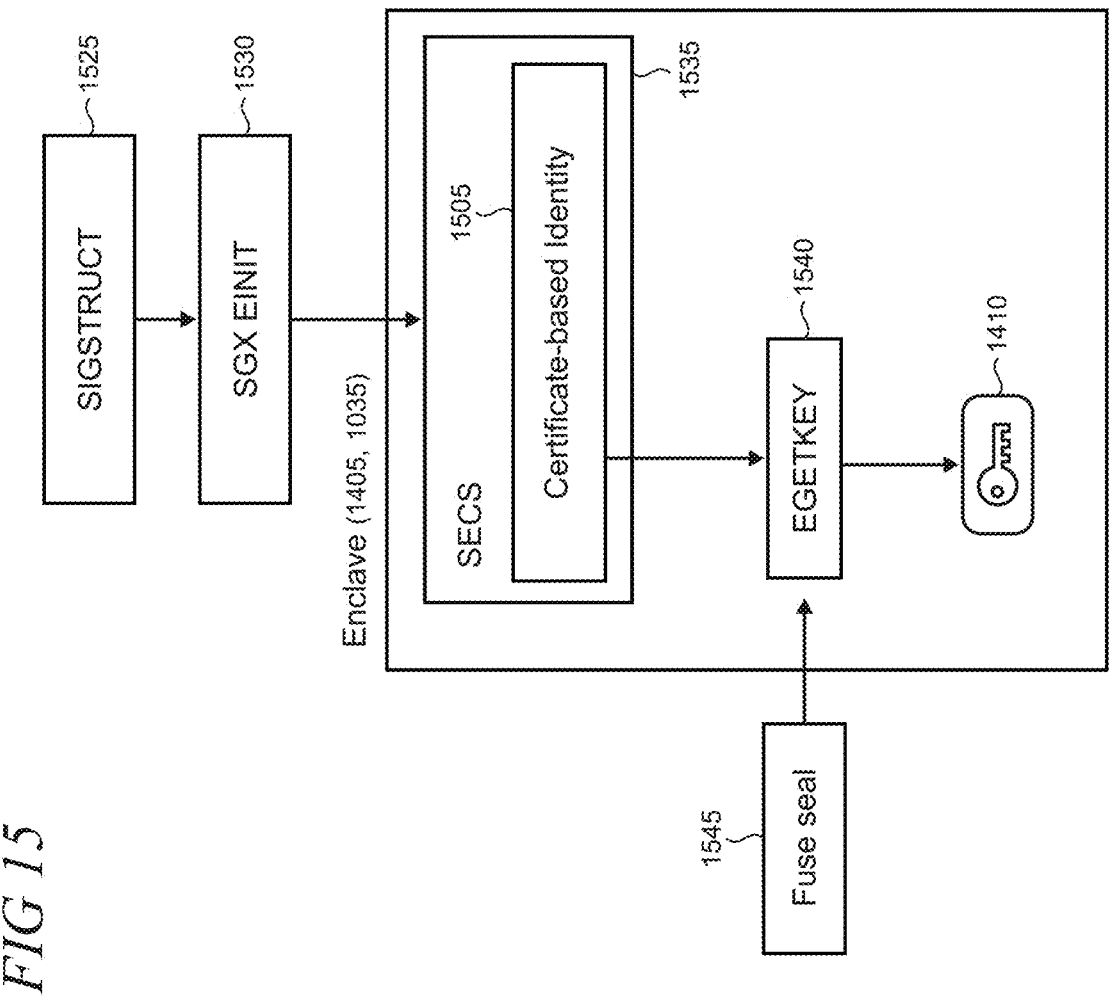
FIG. 15 shows an illustrative certificate-based enclave identity arrangement.

As shown in FIG. 15, each SGX enclave (UEFI enclave 1405, and deferral ticket minting enclave 1035) utilizes a certificate-based identity 1505 in which a certificate 1525 is formatted with Signature Structures (SIGSTRUCT). An initialization instruction, EINIT 1530, examines the target enclave's certificate and uses the information to populate the SECS (SGX Enclave Control Structure) field 1535 that describes the enclave's certificate-based identity. The enclave uses an EGETKEY instruction 1540 to derive the corresponding symmetric key 1410 based on its identity.

SGX enclaves utilize unique secrets generated randomly with strong entropy during x86 processor production comprising two fuse keys including a Root Provisioning Key (RPK) and Root Sealing Key (RSK). The RSK value is used as the root for all EGETKEY derivations. Accordingly, the UEFI enclave and the deferral ticket minting enclave are bound to the same machine using a fuse seal 1545.

In conventional SGX enclave applications, the symmetric key 1410 is typically utilized in combination with cryptographic primitives to protect the confidentiality and integrity of an enclave's secrets while they are migrated to another enclave by an untrusted OS. For example, an SGX versioning support protocol may leverage the one-level certificate-based enclave identity scheme to facilitate migration of secrets between enclaves that are running different versions of the same software. For example, an upgraded version of software can use EGETKEY to retrieve keys created by former versions. Updated enclave instantiations can thus decrypt data sealed with keys of their former versions.

In contrast to its conventional use for migration of secrets between different versions of the same software, the SGX versioning support protocol is used in the present automated recovery of far edge computing infrastructure to provide the symmetric key to enable a cryptographically secure channel to be established between the deferral ticketing minting enclave and the SMI handler (as discussed below and shown in FIG. 18).

Figure 16:
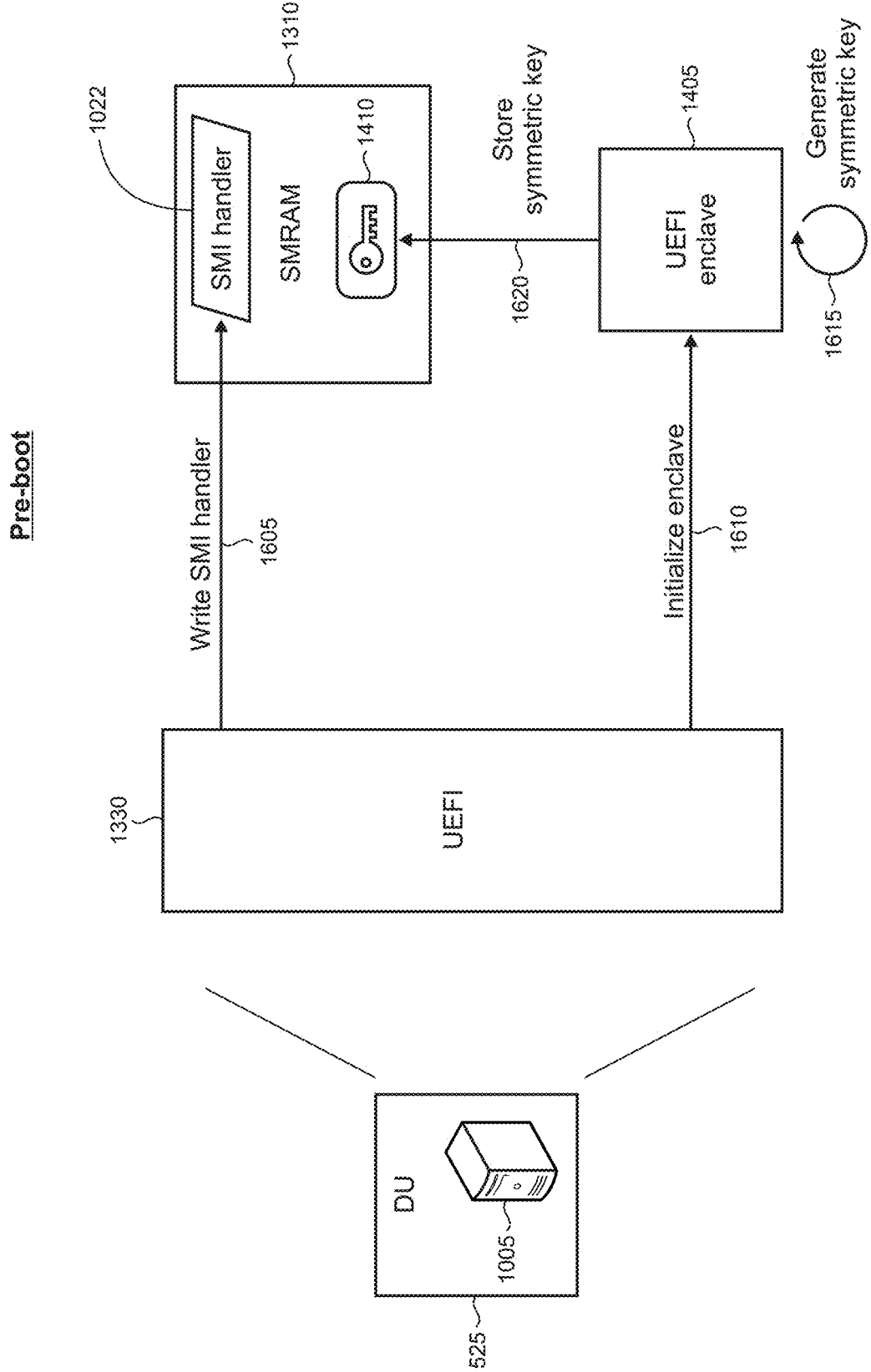
FIGS. 16 and 17 show illustrative symmetric key provisioning that is resilient against malware that may be executing in an untrusted OS.
Figure 17:
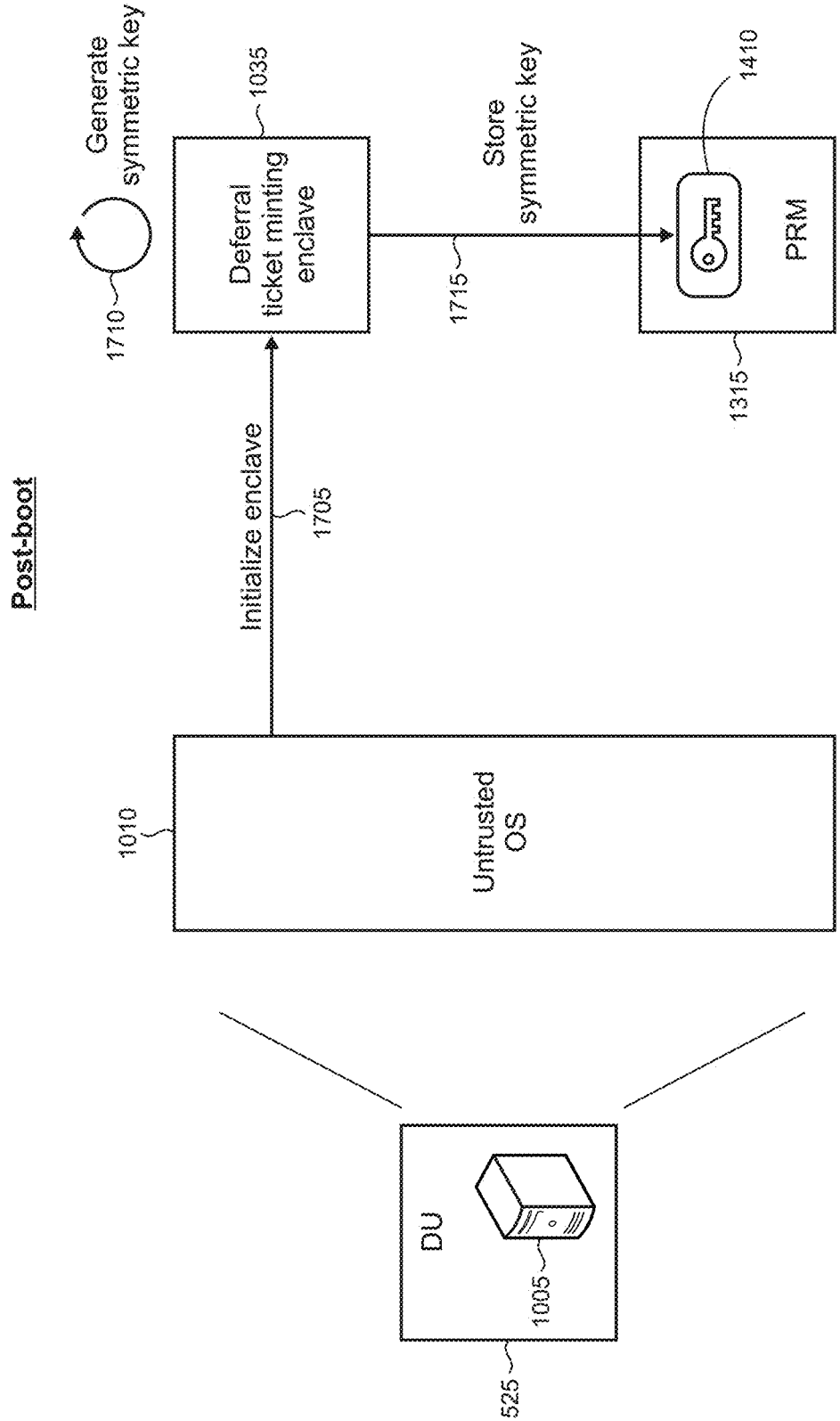

FIGS. 16 and 17 respectively show illustrative symmetric key provisioning for the SMI handler 1022 and deferral ticket enclave 1035. During a pre-boot phase of the computing device 1005, as shown in FIG. 16, the UEFI 1330 writes the SMI handler to the SMRAM 1310 (as indicated by reference numeral 1605). The UEFI then initializes a UEFI enclave (1610), so that the symmetric key 1410 can be generated (1615) and stored in the SMRAM (1620). During the pre-boot phase, all operations, including the passing of the symmetric key between the UEFI enclave and SMRAM, are trusted operations.

In FIG. 17, during a post-boot phase of the computing device 1005, the untrusted OS 1010 initializes the deferral ticket minting enclave 1035 (as indicated by reference numeral 1705). The deferral ticket minting enclave generates the symmetric key 1410 (1710) which, as described above, is the same key generated by the UEFI enclave. The symmetric key is stored by the enclave in the PRM 1315 (1715) to thereby protect it from the untrusted OS.

Figure 18:
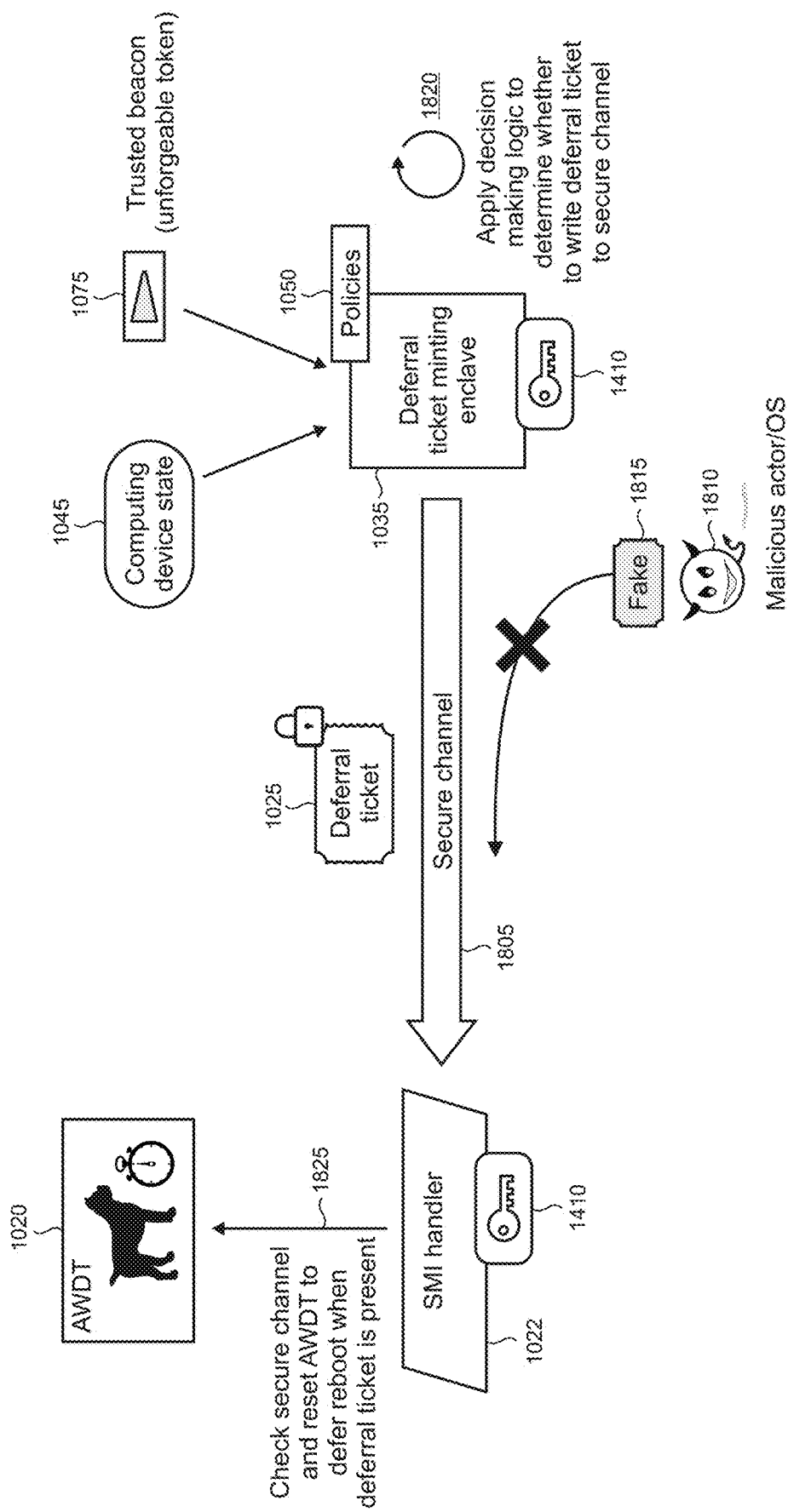
FIG. 18 shows an illustrative secure deferral ticket channel between a deferral ticket minting process that runs in an enclave and a Security Management Interrupt (SMI) handler.

FIG. 18 shows an illustrative secure deferral ticket channel 1805 established between the deferral ticket minting enclave 1035 and the SMI handler 1022 using the symmetric key 1410. The channel is cryptographically secured by the symmetric key 1410 that is accessible by both the ticket minting enclave and SMI handler. The cryptographic security prevents a malicious actor and/or operating system (collectively indicated by reference numeral 1810) from spoofing or injecting a fake deferral ticket 1815 into the channel to attempt to inappropriately defer a reboot and re-imaging of the computing device which would otherwise cause the malicious actor to be evicted from the platform. In addition, the deferral tickets have security properties to uniquely bind them to the local computing device to prevent the injection of deferral tickets generated on a different compromised host.

As indicated by reference numeral 1820, the deferral ticket minting enclave 1035 applies decision making logic in view of applicable policies 1050 to determine whether to write a deferral ticket to the secure channel 1805 based on the monitored computing device state 1045. If the computing device and/or RAN is determined to be sufficiently healthy per the policies, then the enclave mints a single-use deferral ticket 1025 which is written to the secure channel 1805 that is accessible by the SMI handler 1022. The deferral tickets are designed to be single-use to protect against replay and man-in-the-middle attacks, spoofing/ impersonation, and the like. Application of a freshness criteria for the deferral tickets can ensure against ticket replication.

When the AWDT 1020 counts down to trigger an interrupt (i.e., SMI), the SMI handler 1022 checks the secure channel 1805 for the presence of the deferral ticket 1025 to responsively defer reboot, as indicated by reference numeral 1825. If a valid deferral ticket is absent, because the deferral ticket minting enclave has withheld minting of the ticket for any reason or the deferral ticket is not fresh according to some suitable freshness criteria, then the SMI handler, upon the AWDT counter counting down to some predetermined value (e.g., reaching zero), will force the computing device to reboot and re-image from the recovery OS, as discussed above with reference to FIG. 11. For example, the enclave may determine from the state data 1045 that the health of the computing device and/or RAN is below some threshold established by policies 1050. If a valid ticket is present in the secure channel, then the SMI handler defers reboot and resets the AWDT by incrementing the counter upwards by some predetermined value. The particular value used can vary according to the needs of a given implementation where a shorter countdown implies more frequent introspection of the runtime state of the computing device and/or RAN and vice versa.

An alternative deferral ticket workflow may be utilized in some implementations. In this workflow, if the SMI handler 1022 does not receive a deferral ticket from the secure channel 1805 prior to the AWDT 1020 firing the interrupt, then the SMI handler forces the reboot and re-imaging of the computing device 1005 (FIG. 10) from the recovery OS 1015. The SMI handler will increment the AWDT whenever it receives a deferral ticket 1025 over the secure channel to thereby prevent the AWDT from counting down and rebooting the platform during the firing of the interrupt. While the particular workflow can vary by implementation, the default behavior of the SMI handler to force the computing device to reboot and re-image from the recovery OS to the golden state is consistent among all implementations—without the deferral ticket being present, automated recovery of the computing device is performed upon expiration of the timer.

The deferral ticket minting enclave 1035 may also incorporate the presence of a fresh trusted beacon 1075 in the decision making process 1820 in some embodiments. For example, if the trusted beacon is absent, the deferral ticket minting enclave can decide not to mint the deferral ticket which causes the computing device 1004 to reboot and re-image when the AWDT 1020 expires (e.g., counts down to zero).

Figure 19:
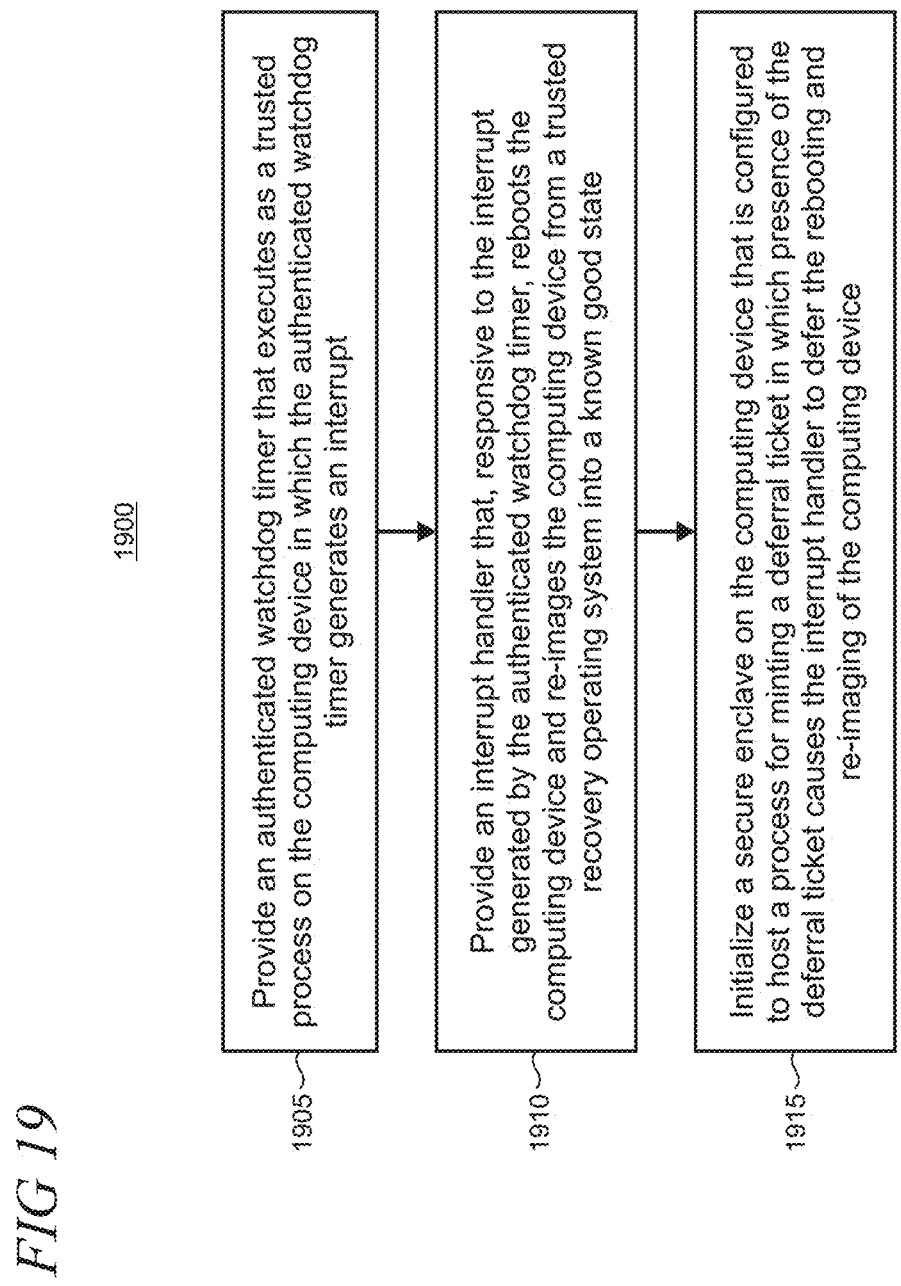
FIGS. 19, 20, and 21 show illustrative methods that may be performed when implementing the present automated recovery of far edge computing infrastructure in a 5G network.

FIG. 19 is a flowchart of an illustrative method 1900 that may be executed on a computing device used as infrastructure in a 5G network. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

As shown, block 1905 of the method includes providing an authenticated watchdog timer that executes as a trusted process on the computing device in which the authenticated watchdog timer generates an interrupt. For example, if the AWDT's value is zero, the interrupt will cause the computing device to reboot.

Block 1910 includes providing an interrupt handler that, responsive to the interrupt generated by the authenticated watchdog timer, reboots the computing device and re-images the computing device from a trusted recovery operating system into a known good state.

Block 1915 comprises initializing a secure enclave on the computing device that is configured to host a process for minting a deferral ticket in which presence of the deferral ticket causes the interrupt handler to defer the rebooting and re-imaging of the computing device.

Figure 20:
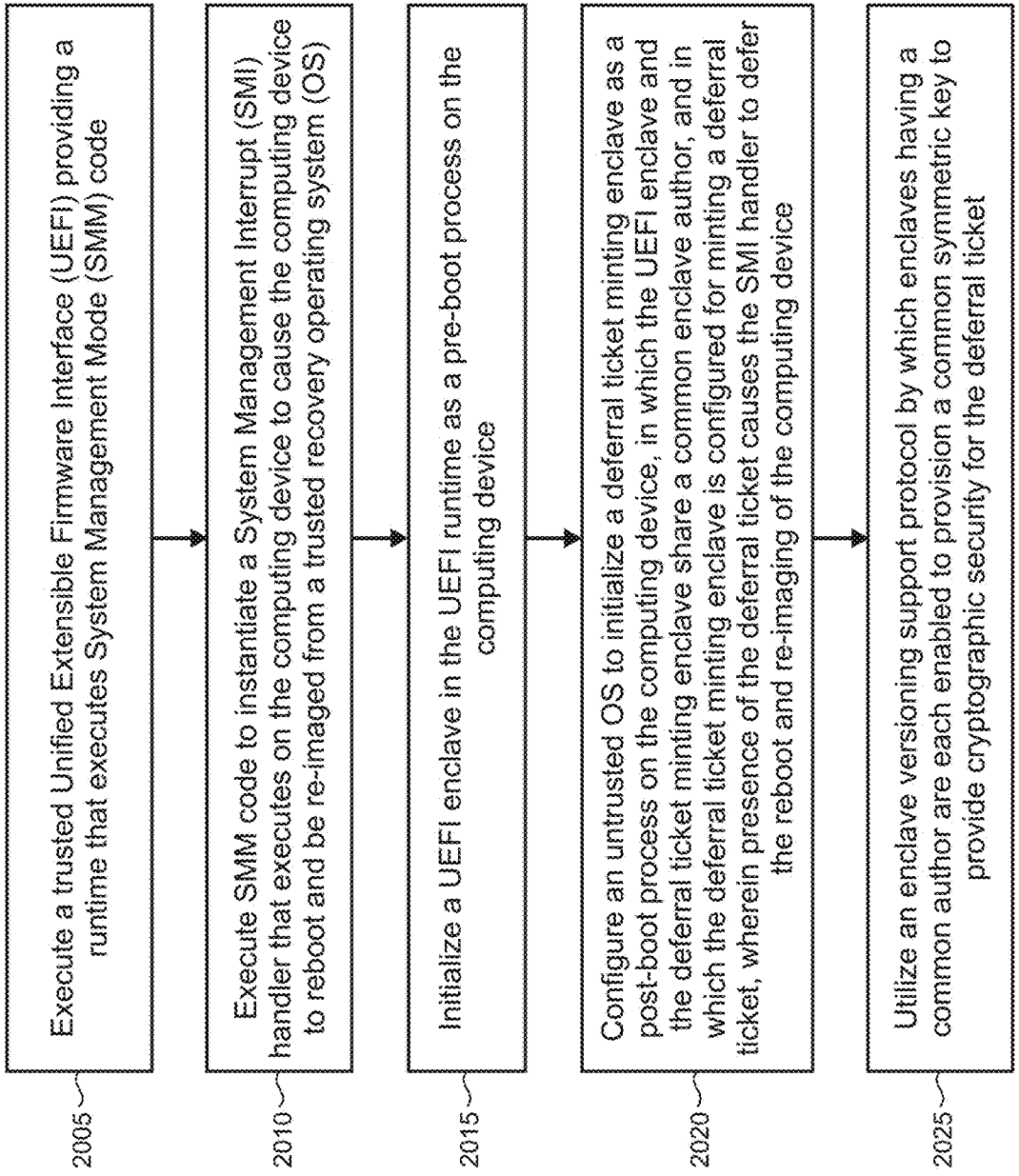

FIG. 20 is a flowchart of an illustrative method 2000 that may be performed by a computing device. For example, the computing device may be located in the far edge infrastructure of a 5G network. At block 2005, a trusted UEFI providing a runtime that executes SMM code is executed.

At block 2010, SMM code is executed to instantiate an SMI handler that executes on the computing device to cause the computing device to reboot, for example if AWDT is zero, and be re-imaged from a trusted recovery OS. At block 2015, a UEFI enclave is initialized in the UEFI runtime as a pre-boot process on the computing device.

At block 2020, an untrusted OS is configured to initialize a deferral ticket minting enclave as a post-boot process on the computing device, in which the UEFI enclave and the deferral ticket minting enclave share a common enclave author, and in which the deferral ticket minting enclave is configured for minting a deferral ticket, wherein presence of the deferral ticketing causes the SMI handler to defer the reboot and re-imaging of the computing device.

At block 2025, an enclave versioning support protocol is utilized by which enclaves having a common author are each enabled to provision a common symmetric key to provide cryptographic security for the deferral ticket.

Figure 21:
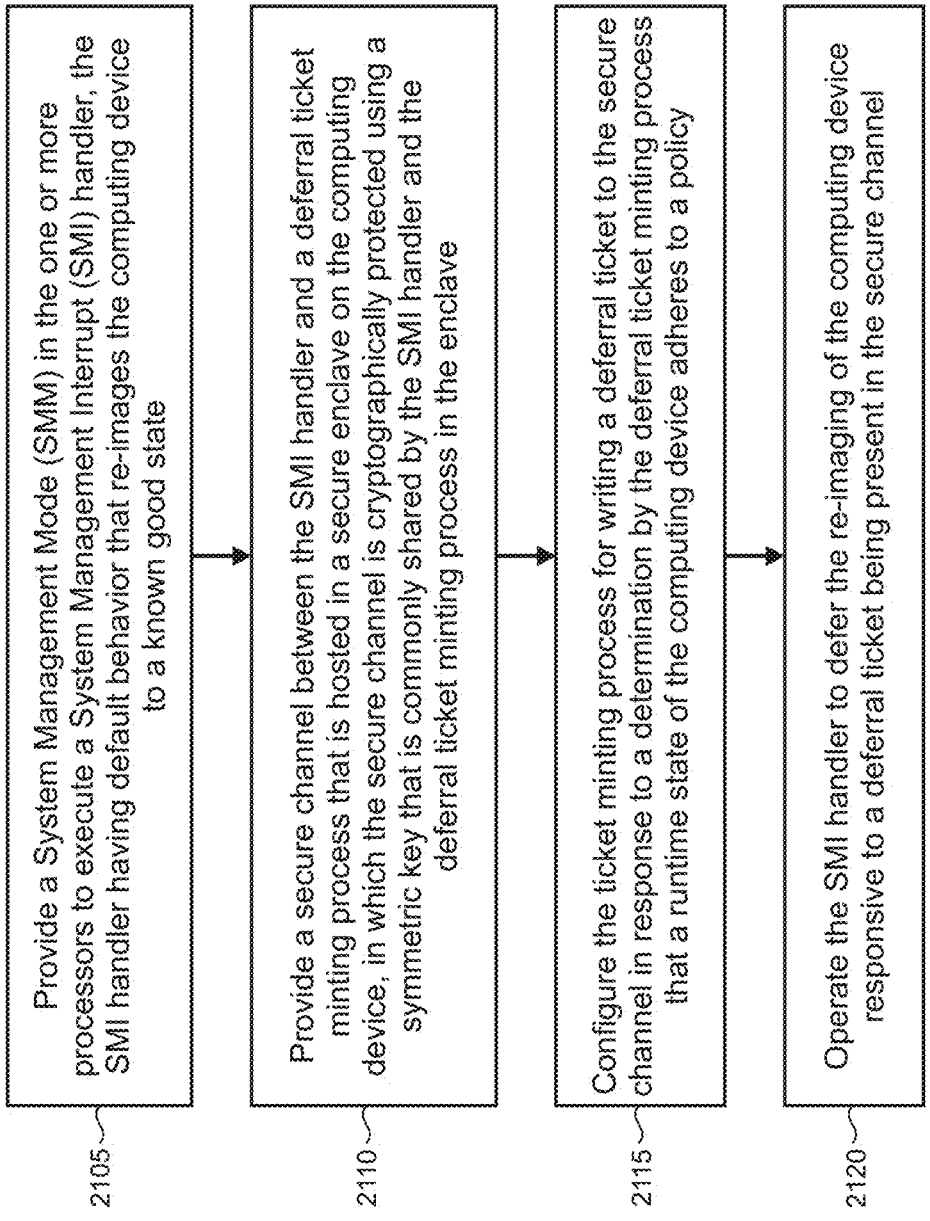

FIG. 21 is a flowchart of an illustrative method 2100 that may be executed on a computing device used as infrastructure in a 5G network. At block 2105, SMM is provided for in the one or more processors to execute an SMI handler, the SMI handler having default behavior that re-images the computing device to a known good state.

At block 2110, a secure channel is provided between the SMI handler and a deferral ticket minting process that is hosted in a secure enclave on the computing device, in which the secure channel is cryptographically protected using a symmetric key that is commonly shared by the SMI handler and the ticket minting process in the enclave.

At block 2115, the ticket minting process is configured for writing a deferral ticket to the secure channel in response to a determination by the ticket minting process that a runtime state of the computing device adheres to a policy. At block 2120, the SMI handler is operated to defer the re-imaging of the computing device responsive to a deferral ticket being present in the secure channel.

Figure 22:
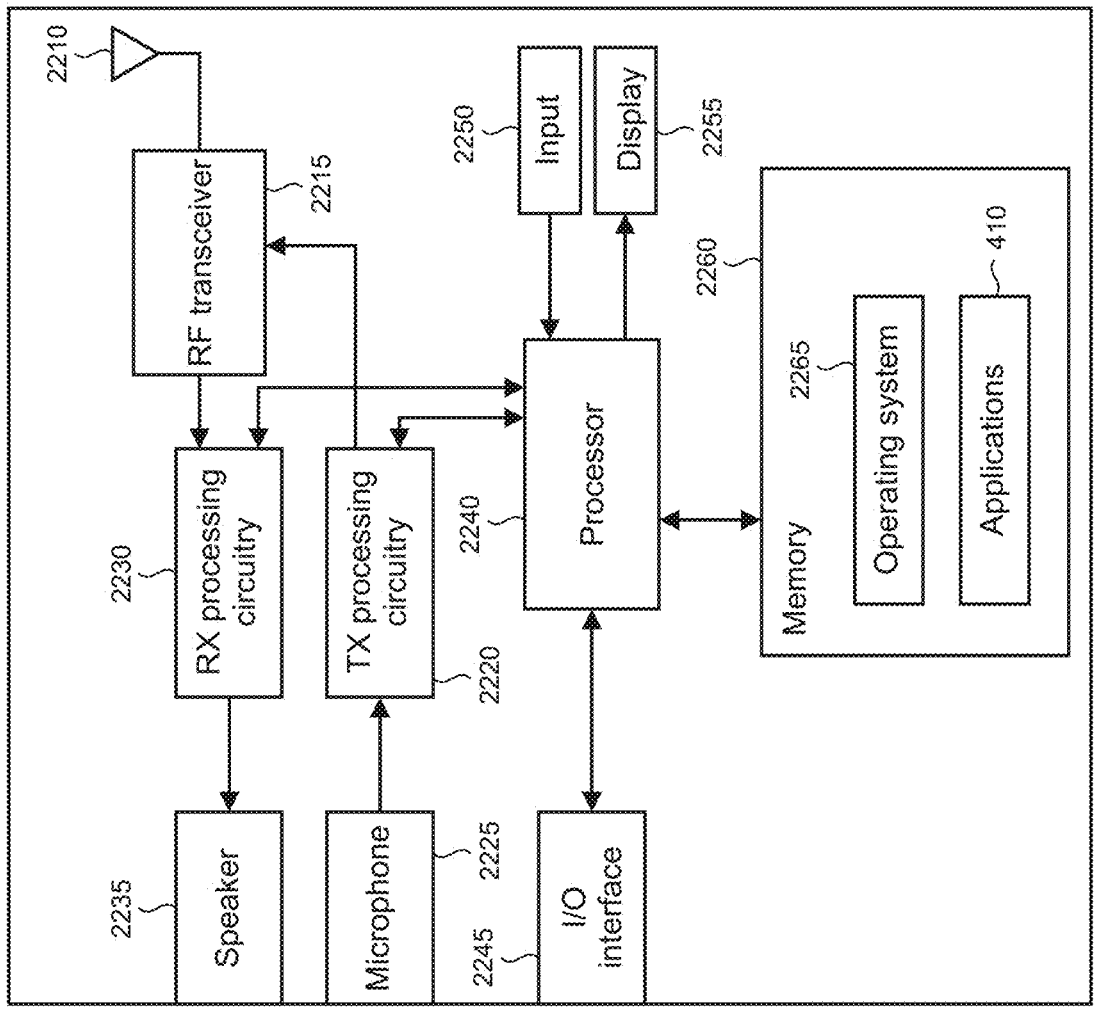
FIG. 22 is a block diagram of an illustrative UE that may be used at least in part to implement the present automated recovery of far edge infrastructure in a 5G network.

FIG. 22 is a block diagram of an illustrative UE 200 that may be used at least in part to implement the present automated recovery of far edge infrastructure in a 5G network. The embodiment of the UE 200 shown in FIG. 22 is for illustration only, and the UEs 200 shown in the drawings and described in the preceding text may have the same or similar configuration. However, it is noted that UEs may come in a wide variety of configurations, and FIG. 22 does not limit the scope of the present disclosure to any particular implementation of a UE.

The UE 200 includes an antenna 2210, a radio frequency (RF) transceiver 2215, transmit (TX) processing circuitry 2220, a microphone 2225, and receive (RX) processing circuitry 2230. The UE 200 also includes a speaker 2235, a processor 2240, an input/output (I/O) interface 2245, an input device 2250, a display 2255, and a memory 2260. The memory includes an operating system (OS) program 2265 and one or more applications 410.

The RF transceiver 2215 receives from the antenna 2210, an incoming RF signal transmitted by a gNB of a 5G network 400 (FIG. 4). The RF transceiver down-converts the incoming RF signal to generate an intermediate frequency (IF) or baseband signal. The IF or baseband signal is sent to the RX processing circuitry 2230, which generates a processed baseband signal by filtering, decoding, and/or digitizing the baseband or IF signal. The RX processing circuitry transmits the processed baseband signal to the speaker 2235 (such as for voice data) or to the processor 2240 for further processing (such as for web browsing data).

The TX processing circuitry 2220 receives analog or digital voice data from the microphone 2225 or other outgoing baseband data (such as web data, e-mail, or interactive video game data) from the processor 2240. The TX processing circuitry 2220 encodes, multiplexes, and/or digitizes the outgoing baseband data to generate a processed baseband or IF signal. The RF transceiver 2215 receives the outgoing processed baseband or IF signal from the TX processing circuitry and up-converts the baseband or IF signal to an RF signal that is transmitted via the antenna.

The processor 2240 can include one or more processors or other processing devices and execute the OS program 2265 stored in the memory 2260 to control the overall operation of the UE 200. For example, the processor may control the reception of forward channel signals and the transmission of reverse channel signals by the RF transceiver 2215, the RX processing circuitry 2230, and the TX processing circuitry 2220 in accordance with well-known principles. In some embodiments, the processor 2240 includes at least one microprocessor or microcontroller.

The processor 2240 may be configured for executing other processes and programs resident in the memory 2260, such as operations for CSI measurement and reporting for systems described in embodiments of the present disclosure. The processor can move data into or out of the memory as required by an executing process. In some embodiments, the processor may be configured to execute the applications 410 based on the OS program 2265 or in response to signals received from gNBs or an operator. The processor is also coupled to the I/O interface 2245, which provides the UE 200 with the ability to connect to other computing devices such as laptop computers and handheld computers. The I/O interface may thus function as a communication path between such accessories and the processor.

The processor 2240 is also coupled to the input device 2250 (e.g., keypad, touchscreen, buttons etc.) and the display 2255. A user of the UE 200 can typically employ the input device to enter data into the UE. For example, the display can be a liquid crystal display or other display capable of rendering text and/or graphics, video, etc. from web sites, applications, and/or service providers.

The memory 2260 is coupled to the processor 2240. Part of the memory may include a random access memory (RAM), and another part of the memory may include a Flash memory or other read-only memory (ROM).

As described in more detail below, the UE 200 can perform signaling and calculation for channel state information (CSI) reporting. Although FIG. 22 shows one illustrative example of UE 200, it may be appreciated that various changes may be made to the drawing. For example, various components may be combined, further subdivided, or omitted, and additional components may be added according to particular needs. As a particular example, the processor 2240 may be divided into multiple processors, such as one or more CPUs and one or more graphics processing units (GPUs). Also, while FIG. 22 depicts the UE 200 as configured as a mobile device, such as a smartphone, UEs may be configured to operate as other types of portable or stationary devices.

Figure 23:
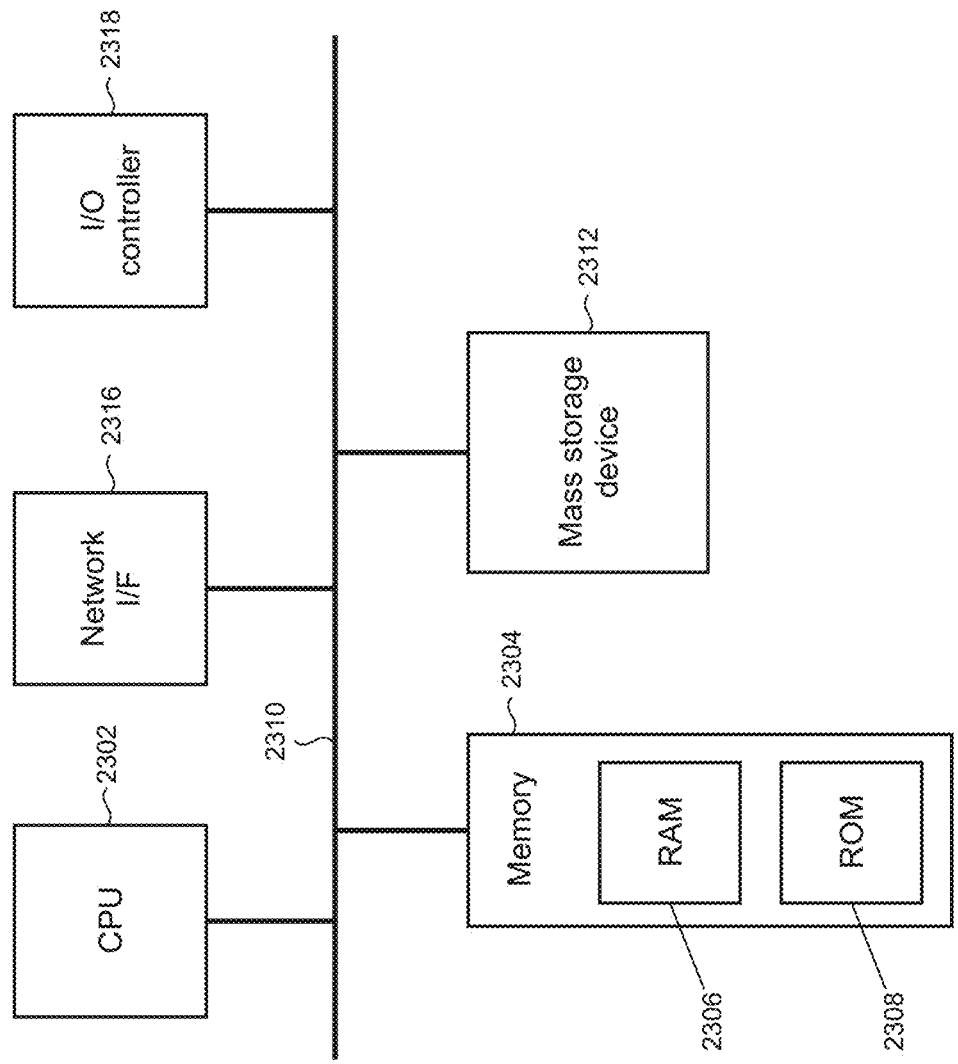
FIG. 23 is a block diagram of an illustrative server or computing device that may be used at least in part to implement the present automated recovery of far edge infrastructure in a 5G network.

FIG. 23 shows an illustrative architecture 2300 for a computing device, such as a server, capable of executing the various components described herein for the present automated recovery of far edge infrastructure in a 5G network. The architecture 2300 illustrated in FIG. 23 includes one or more processors 2302 (e.g., central processing unit, dedicated AI chip, graphics processing unit, etc.), a system memory 2304, including RAM (random access memory) 2306 and ROM (read only memory) 2308, and a system bus 2310 that operatively and functionally couples the components in the architecture 2300. A basic input/output system containing the basic routines that help to transfer information between elements within the architecture 2300, such as during startup, is typically stored in the ROM 2308. The architecture 2300 further includes a mass storage device 2312 for storing software code or other computer-executed code that is utilized to implement applications, the file system, and the operating system. The mass storage device 2312 is connected to the processor 2302 through a mass storage controller (not shown) connected to the bus 2310. The mass storage device 2312 and its associated computer-readable storage media provide non-volatile storage for the architecture 2300. Although the description of computer-readable storage media contained herein refers to a mass storage device, such as a hard disk or CD-ROM drive, it may be appreciated by those skilled in the art that computer-readable storage media can be any available storage media that can be accessed by the architecture 2300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2300.

According to various embodiments, the architecture 2300 may operate in a networked environment using logical connections to remote computers through a network. The architecture 2300 may connect to the network through a network interface unit 2316 connected to the bus 2310. It may be appreciated that the network interface unit 2316 also may be utilized to connect to other types of networks and remote computer systems. The architecture 2300 also may include an input/output controller 2318 for receiving and processing input from a number of other devices, including a keyboard, mouse, touchpad, touchscreen, control devices such as buttons and switches or electronic stylus (not shown in FIG. 23). Similarly, the input/output controller 2318 may provide output to a display screen, user interface, a printer, or other type of output device (also not shown in FIG. 23).

It may be appreciated that the software components described herein may, when loaded into the processor 2302 and executed, transform the processor 2302 and the overall architecture 2300 from a general-purpose computing system into a special-purpose computing system customized to facilitate the functionality presented herein. The processor 2302 may be constructed from any number of transistors or other discrete circuit elements, which may individually or collectively assume any number of states. More specifically, the processor 2302 may operate as a finite-state machine, in response to executable instructions contained within the software modules disclosed herein. These computer-executable instructions may transform the processor 2302 by specifying how the processor 2302 transitions between states, thereby transforming the transistors or other discrete hardware elements constituting the processor 2302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2300 in order to store and execute the software components presented herein. It also may be appreciated that the architecture 2300 may include other types of computing devices, including wearable devices, handheld computers, embedded computer systems, smartphones, PDAs, and other types of computing devices known to those skilled in the art. It is also contemplated that the architecture 2300 may not include all of the components shown in FIG. 23, may include other components that are not explicitly shown in FIG. 23, or may utilize an architecture completely different from that shown in FIG. 23.

Figure 24:
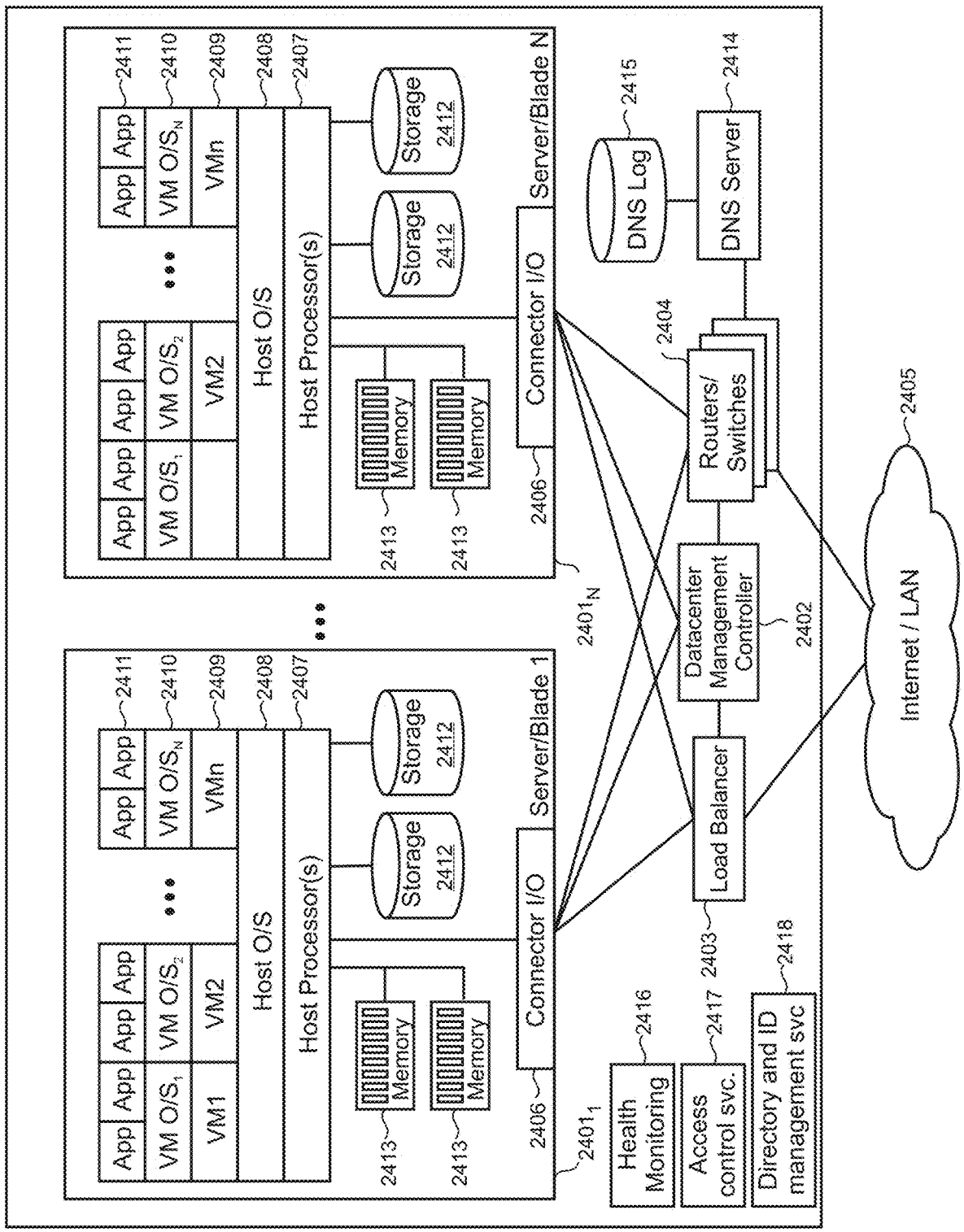
FIG. 24 is a block diagram of an illustrative datacenter that may be used at least in part to implement the present automated recovery of far edge infrastructure in a 5G network.

FIG. 24 is a high-level block diagram of an illustrative datacenter 2400 that provides cloud computing services or distributed computing services that may be used to implement the present automated recovery of far edge infrastructure in a 5G network. Datacenter 2400 may incorporate one or more of the features disclosed in the DCs shown in the drawings and described in the accompanying text. A plurality of servers 2401 are managed by datacenter management controller 2402. Load balancer 2403 distributes requests and computing workloads over servers 2401 to avoid a situation wherein a single server may become overwhelmed. Load balancer 2403 maximizes available capacity and performance of the resources in datacenter 2400. Routers/switches 2404 support data traffic between servers 2401 and between datacenter 2400 and external resources and users (not shown) via an external network 2405, which may be, for example, a local area network (LAN) or the Internet.

Servers 2401 may be standalone computing devices, and/or they may be configured as individual blades in a rack of one or more server devices. Servers 2401 have an input/output (I/O) connector 2406 that manages communication with other database entities. One or more host processors 2407 on each server 2401 run a host operating system (O/S) 2408 that supports multiple virtual machines (VM) 2409. Each VM 2409 may run its own O/S so that each VM O/S 2410 on a server is different, or the same, or a mix of both. The VM O/Ss 2410 may be, for example, different versions of the same O/S (e.g., different VMs running different current and legacy versions of the Windows® operating system). In addition, or alternatively, the VM O/Ss 2410 may be provided by different manufacturers (e.g., some VMs running the Windows® operating system, while other VMs are running the Linux® operating system). Each VM 2409 may also run one or more applications (App) 2411. Each server 2401 also includes storage 2412 (e.g., hard disk drives (HDD)) and memory 2413 (e.g., RAM) that can be accessed and used by the host processors 2407 and VMs 2409 for storing software code, data, etc. In one embodiment, a VM 2409 may employ the data plane APIs as disclosed herein.

Datacenter 2400 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 2400 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 2409 on server $2401_1$ to run their applications 2411. When demand for an application 2411 increases, the datacenter 2400 may activate additional VMs 2409 on the same server $2401_1$ and/or on a new server $2401_N$ as needed. These additional VMs 2409 can be deactivated if demand for the application later drops.

Datacenter 2400 may offer guaranteed availability, disaster recovery, and back-up services. For example, the datacenter may designate one VM 2409 on server $2401_1$ as the primary location for the tenant's application and may activate a second VM 2409 on the same or a different server as a standby or back-up in case the first VM or server $2401_1$ fails. The datacenter management controller 2402 automatically shifts incoming user requests from the primary VM to the back-up VM without requiring tenant intervention. Although datacenter 2400 is illustrated as a single location, it will be understood that servers 2401 may be distributed to multiple locations across the globe to provide additional redundancy and disaster recovery capabilities. Additionally, datacenter 2400 may be an on-premises, private system that provides services to a single enterprise user or may be a publicly accessible, distributed system that provides services to multiple, unrelated customers and tenants or may be a combination of both.

Domain Name System (DNS) server 2414 resolves domain and host names into IP addresses for all roles, applications, and services in datacenter 2400. DNS log 2415 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 2416 monitors the health of the physical systems, software, and environment in datacenter 2400. Health monitoring 2416 provides feedback to datacenter managers when problems are detected with servers, blades, processors, or applications in datacenter 2400 or when network bandwidth or communications issues arise.

Access control service 2417 determines whether users are allowed to access particular connections and services provided at the datacenter 2400. Directory and identity management service 2418 authenticates user credentials for tenants on datacenter 2400.

Figure 25:
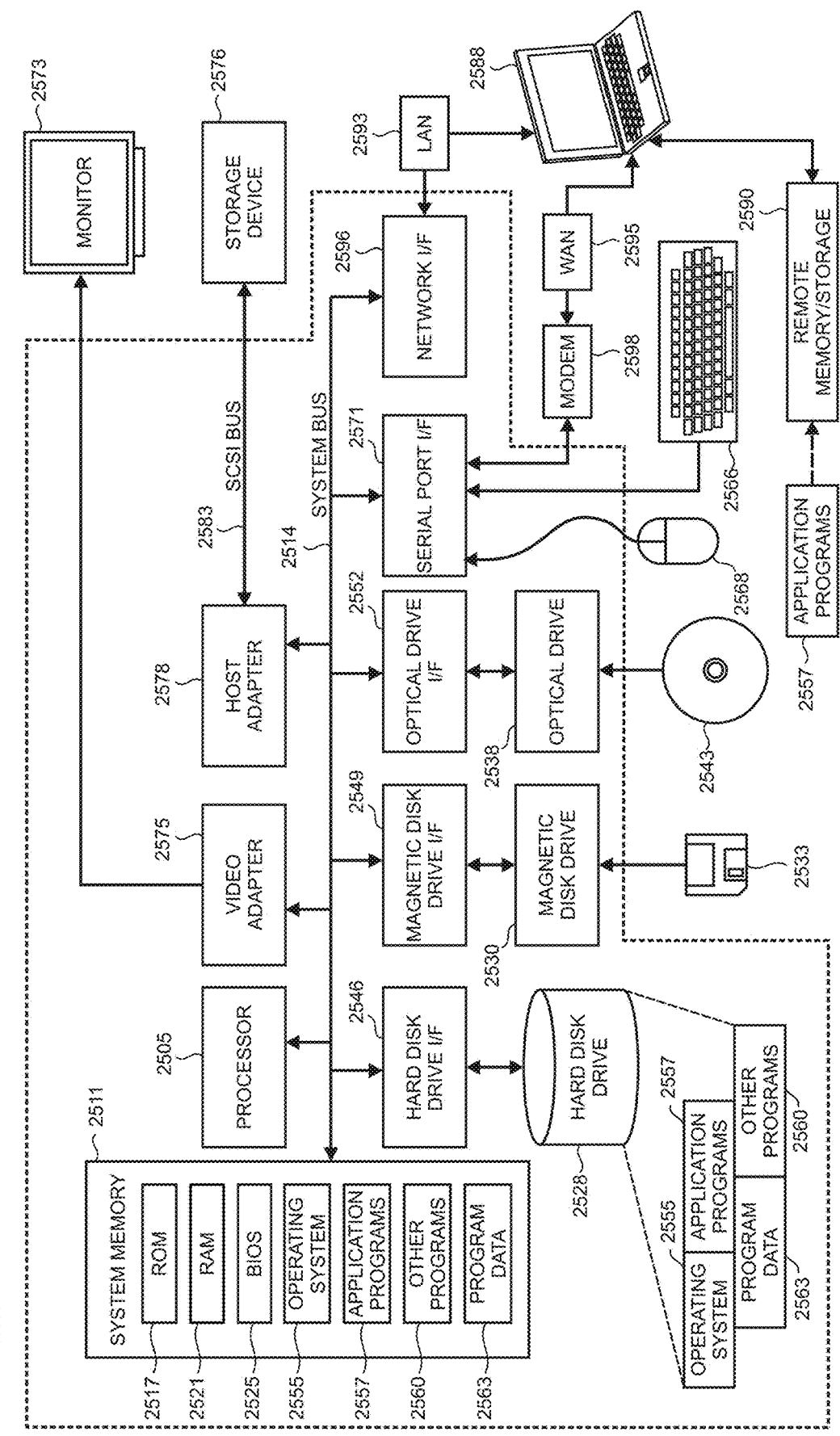
FIG. 25 is a simplified block diagram of an illustrative computer system that may be used at least in part to implement the present automated recovery of far edge infrastructure in a 5G network.

FIG. 25 is a simplified block diagram of an illustrative computer system 2500 such as a PC, client machine, or server with which the present automated recovery of far edge infrastructure in a 5G network may be implemented. Computer system 2500 includes a processor 2505, a system memory 2511, and a system bus 2514 that couples various system components including the system memory 2511 to the processor 2505. The system bus 2514 may be any of several types of bus structures including a memory bus or memory controller, a peripheral bus, or a local bus using any of a variety of bus architectures. The system memory 2511 includes read only memory (ROM) 2517 and random access memory (RAM) 2521. A basic input/output system (BIOS) 2525, containing the basic routines that help to transfer information between elements within the computer system 2500, such as during startup, is stored in ROM 2517. The computer system 2500 may further include a hard disk drive 2528 for reading from and writing to an internally disposed hard disk (not shown), a magnetic disk drive 2530 for reading from or writing to a removable magnetic disk 2533 (e.g., a floppy disk), and an optical disk drive 2538 for reading from or writing to a removable optical disk 2543 such as a CD (compact disc), DVD (digital versatile disc), or other optical media. The hard disk drive 2528, magnetic disk drive 2530, and optical disk drive 2538 are connected to the system bus 2514 by a hard disk drive interface 2546, a magnetic disk drive interface 2549, and an optical drive interface 2552, respectively. The drives and their associated computer-readable storage media provide non-volatile storage of computer-readable instructions, data structures, program modules, and other data for the computer system 2500. Although this illustrative example includes a hard disk, a removable magnetic disk 2533, and a removable optical disk 2543, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present automated recovery of far edge infrastructure in a 5G network. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2533, optical disk 2543, ROM 2517, or RAM 2521, including an operating system 2555, one or more application programs 2557, other program modules 2560, and program data 2563. A user may enter commands and information into the computer system 2500 through input devices such as a keyboard 2566 and pointing device 2568 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2505 through a serial port interface 2571 that is coupled to the system bus 2514, but may be connected by other interfaces, such as a parallel port, game port, or universal serial bus (USB). A monitor 2573 or other type of display device is also connected to the system bus 2514 via an interface, such as a video adapter 2575. In addition to the monitor 2573, personal computers typically include other peripheral output devices (not shown), such as speakers and printers. The illustrative example shown in FIG. 25 also includes a host adapter 2578, a Small Computer System Interface (SCSI) bus 2583, and an external storage device 2576 connected to the SCSI bus 2583.

The computer system 2500 is operable in a networked environment using logical connections to one or more remote computers, such as a remote computer 2588. The remote computer 2588 may be selected as another personal computer, a server, a router, a network PC, a peer device, or other common network node, and typically includes many or all of the elements described above relative to the computer system 2500, although only a single representative remote memory/storage device 2590 is shown in FIG. 25. The logical connections depicted in FIG. 25 include a local area network (LAN) 2593 and a wide area network (WAN) 2595. Such networking environments are often deployed, for example, in offices, enterprise-wide computer networks, intranets, and the Internet.

When used in a LAN networking environment, the computer system 2500 is connected to the local area network 2593 through a network interface or adapter 2596. When used in a WAN networking environment, the computer system 2500 typically includes a broadband modem 2598, network gateway, or other means for establishing communications over the wide area network 2595, such as the Internet. The broadband modem 2598, which may be internal or external, is connected to the system bus 2514 via a serial port interface 2571. In a networked environment, program modules related to the computer system 2500, or portions thereof, may be stored in the remote memory storage device 2590. It is noted that the network connections shown in FIG. 25 are illustrative and other means of establishing a communications link between the computers may be used depending on the specific requirements of an application of the present automated recovery of far edge infrastructure in a 5G network.

Various exemplary embodiments of the present automated recovery of far edge computing infrastructure in a 5G network are now presented by way of illustration and not as an exhaustive list of all embodiments. An example includes a computer-implemented method executed on a computing device used as infrastructure of a 5G (fifth generation)

network, comprising: providing an authenticated watchdog timer that executes as a trusted process on the computing device in which the authenticated watchdog timer generates an interrupt; providing an interrupt handler that, responsive to the interrupt generated by the authenticated watchdog timer, reboots the computing device and re-images the computing device from a trusted recovery operating system into a known good state; and initializing a secure enclave on the computing device that is configured to host a process for minting a deferral ticket in which presence of the deferral ticket causes the interrupt handler to defer the rebooting and re-imaging of the computing device.

In another example, the computer-implemented method further includes instantiating the authenticated watchdog timer and the interrupt handler using code that executes in a System Management Mode (SMM) on a processor of the computing device. In another example, the computer-implemented method further includes configuring the interrupt handler as an SMI (Secure Management Interrupt) handler that is instantiated by a Unified Extensible Firmware Interface (UEFI) and written to protected SMRAM (System Management Random Access Memory) on the computing device. In another example, the computer-implemented method further includes monitoring a state of the computing device and minting the deferral ticket responsively to the monitored state. In another example, the computer-implemented method further includes configuring the secure enclave to write the deferral ticket to a secure channel and configuring the secure channel using a cryptographic primitive comprising a symmetric key. In another example, the symmetric key is provisioned using an enclave software versioning protocol that enables two enclaves having a common author to use a common symmetric key to migrate secrets between the two enclaves. In another example, the computer-implemented method further includes providing one or more policies that are applicable to the deferral ticket minting process in which the deferral ticket is minted responsively to the one or more policies and in which the one or more policies relate to integrity of the computing device during runtime. In another example, the computing device is utilized in a distributed unit (DU) of a radio access network (RAN) portion of the 5G network infrastructure. In another example, the secure enclave is an SGX (Software Guard Extension) enclave.

A further example includes a computing device, comprising: at least one processor that supports a secure execution environment; at least one security monitor configured for runtime introspection of a runtime state of the computing device; hardware-protected System Management Random Access Memory (SMRAM) that is configured for use by the at least one processor to store code associated with a System Management Mode (SMM); at least one non-transitory computer-readable storage device storing computer-executable instructions thereon and further storing code for an operating system (OS) thereon; and an isolated read-only partition of the at least one non-transitory computer-readable storage device storing a recovery OS thereon, wherein the instructions, when executed by the least one processor, cause the computing device to execute a trusted Unified Extensible Firmware Interface (UEFI) providing a runtime that executes System Management Mode (SMM) code; execute SMM code to instantiate a System Management Interrupt (SMI) handler that executes on the computing device to cause the computing device to reboot and be re-imaged from a trusted recovery operating system (OS); initialize a UEFI enclave in the UEFI runtime as a pre-boot process on the computing device; configure an untrusted OS to initialize a deferral ticket minting enclave as a post-boot process on the computing device, in which the UEFI enclave and the deferral ticket minting enclave share a common enclave author, and in which the deferral ticket minting enclave is configured for minting a deferral ticket, wherein presence of the deferral ticket causes the SMI handler to defer the reboot and re-imaging of the computing device; and utilize an enclave versioning support protocol by which enclaves having a common author are each enabled to provision a common symmetric key to provide cryptographic security for the deferral ticket.

In another example, the deferral ticket is configured to be single-use and further configured with security properties to be uniquely bound to the computing device. In another example, the enclave versioning support protocol relies on a one-level certificate authority identity methodology and the common enclave author is established by a Certificate Authority (CA). In another example, the computer-executable instructions, when executed, further cause the computing device to execute SMM code to implement an authenticated watchdog timer (AWDT) configured to fire a System Management Interrupt (SMI) when the AWDT expires. In another example, responsively to the SMI, the SMI handler checks for the presence of the deferral ticket to determine whether to defer rebooting and re-imaging of the computing device.

A further example includes one or more non-transitory computer-readable memory devices storing computer-executable instructions which, upon execution by one or more processors disposed in a computing device deployed in a 5G (fifth generation) network, cause the computing device to: provide for System Management Mode (SMM) in the one or more processors to execute a System Management Interrupt (SMI) handler, the SMI handler having default behavior that re-images the computing device to a known good state; provide a secure channel between the SMI handler and a deferral ticket minting process that is hosted in a secure enclave on the computing device, in which the secure channel is cryptographically protected using a symmetric key that is commonly shared by the SMI handler and the deferral ticket minting process in the enclave; configure the ticket minting process for writing a deferral ticket to the secure channel in response to a determination by the deferral ticket minting process that a runtime state of the computing device adheres to a policy; and operate the SMI handler to defer the re-imaging of the computing device responsive to a deferral ticket being present in the secure channel.

In another example, the runtime state of the computing device is monitored by one or more security monitors that are instantiated in the computing device. In another example, the SMM is executed in a runtime of a trusted Unified Extensible Firmware Interface (UEFI), wherein a UEFI enclave is initiated in the UEFI runtime. In another example, the computer-executable instructions, when executed, further cause the computing device to utilize an SGX (Software Guard Extension) versioning protocol that enables provisioning of the common symmetric key to each of the UEFI enclave and the secure enclave hosting the deferral ticket minting process, wherein the UEFI enclave and the secure enclave hosting the deferral ticket minting process are enabled to provision the common symmetric key under the SGX versioning protocol by virtue of sharing a common author. In another example, the UEFI stores its instance of the common symmetric key in hardware-enforced isolated System Management Random Access Memory (SMRAM) and in which the ticket minting enclave stores its instance of the common symmetric key in hardware-enforced isolated Processor Reserved Memory (PRM). In another example, the executed instructions further cause the computing device to receive a trusted beacon from a remote centralized authority, in which the ticket minting process writes a deferral ticket to the secure channel based on the trusted beacon, in which the trusted beacon comprises an unforgeable token that is signed by the centralized authority.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, operable on a computing device having a processor supporting a secure execution environment in a secure enclave, comprising:
    providing at least one security monitor configured for runtime introspection of a runtime state of the computing device;
    providing at least one non-transitory computer-readable storage device storing code for an operating system (OS) thereon and including an isolated read-only partition storing a recovery OS thereon,
    executing a trusted Unified Extensible Firmware Interface (UEFI) providing a runtime that executes System Management Mode (SMM) code from a hardware-protected System Management Random Access Memory (SM-RAM);
    executing the SMM code to instantiate a System Management Interrupt (SMI) handler that executes on the computing device to cause the computing device to reboot and be re-imaged from a trusted recovery operating system (OS);
    initializing a UEFI enclave in the UEFI runtime as a pre-boot process on the computing device;
    configuring an untrusted OS to initialize a deferral ticket minting enclave as a post-boot process on the computing device, in which the UEFI enclave and the deferral ticket minting enclave share a common enclave author, and in which the deferral ticket minting enclave is configured for minting a deferral ticket based on the runtime state, wherein presence of the deferral ticket causes the SMI handler to defer the reboot and re-imaging of the computing device; and
    utilizing an enclave versioning support protocol by which enclaves having a common author are each enabled to provision a common symmetric key to provide cryptographic security for the deferral ticket.

2. The computer-implemented method of claim 1 further including instantiating an authenticated watchdog timer and an interrupt handler using code that executes in a System Management Mode (SMM) on a processor of the computing device.

3. The computer-implemented method of claim 2 further including configuring the interrupt handler as the SMI (Secure Management Interrupt) handler that is instantiated by the Unified Extensible Firmware Interface (UEFI) and written to the protected SMRAM (System Management Random Access Memory) on the computing device.

4. The computer-implemented method of claim 1 further including monitoring a state of the computing device and minting the deferral ticket responsively to the monitored state.

5. The computer-implemented method of claim 1 further including configuring the secure enclave to write the deferral ticket to a secure channel and configuring the secure channel using a cryptographic primitive comprising a symmetric key.

6. The computer-implemented method of claim 5 in which the symmetric key is provisioned using the enclave versioning support protocol that enables two enclaves having a common author to use a common symmetric key to migrate secrets between the two enclaves.

7. The computer-implemented method of claim 1 further including providing one or more policies that are applicable to the deferral ticket minting process in which the deferral ticket is minted responsively to the one or more policies and in which the one or more policies relate to integrity of the computing device during runtime.

8. The computer-implemented method of claim 1 in which the computing device is utilized in a distributed unit (DU) of a radio access network (RAN) portion of the 5G network infrastructure.

9. The computer-implemented method of claim 1 in which the secure enclave is an SGX (Software Guard Extension) enclave.

10. A computing device, comprising:
    at least one processor that supports a secure execution environment;
    at least one security monitor configured for runtime introspection of a runtime state of the computing device;
    hardware-protected System Management Random Access Memory (SMRAM) that is configured for use by the at least one processor to store code associated with a System Management Mode (SMM);
    at least one non-transitory computer-readable storage device storing computer-executable instructions thereon and further storing code for an operating system (OS) thereon; and
    an isolated read-only partition of the at least one non-transitory computer-readable storage device storing a recovery OS thereon,
    wherein the instructions, when executed by the least one processor, cause the computing device to
    execute a trusted Unified Extensible Firmware Interface (UEFI) providing a runtime that executes System Management Mode (SMM) code;
    execute the SMM code to instantiate a System Management Interrupt (SMI) handler that executes on the computing device to cause the computing device to reboot and be re-imaged from a trusted recovery operating system (OS);
    initialize a UEFI enclave in the UEFI runtime as a pre-boot process on the computing device;
    configure an untrusted OS to initialize a deferral ticket minting enclave as a post-boot process on the computing device, in which the UEFI enclave and the deferral ticket minting enclave share a common enclave author, and in which the deferral ticket minting enclave is configured for minting a deferral ticket, wherein presence of the deferral ticket causes the SMI handler to defer the reboot and re-imaging of the computing device; and
    utilize an enclave versioning support protocol by which enclaves having a common author are each enabled to provision a common symmetric key to provide cryptographic security for the deferral ticket.

11. The computing device of claim 10 in which the deferral ticket is configured to be single-use and further configured with security properties to be uniquely bound to the computing device.

12. The computing device of claim 10 in which the enclave versioning support protocol relies on a one-level certificate authority identity methodology and the common enclave author is established by a Certificate Authority (CA).

13. The computing device of claim 10 in which the computer-executable instructions, when executed, further cause the computing device to execute the SMM code to implement an authenticated watchdog timer (AWDT) configured to fire a System Management Interrupt (SMI) when the AWDT expires.

14. The computing device of claim 13 in which, responsively to the SMI, the SMI handler checks for the presence of the deferral ticket to determine whether to defer rebooting and re-imaging of the computing device.

15. One or more non-transitory computer-readable memory devices storing computer-executable instructions which, upon execution by one or more processors disposed in a computing device deployed in a 5G (fifth generation) network, cause the computing device to:

provide for System Management Mode (SMM) in the one or more processors to execute a System Management Interrupt (SMI) handler, the SMI handler having default behavior that re-images the computing device to a known good state, in which the SMM is executed in a runtime of a trusted Unified Extensible Firmware Interface (UEFI), wherein a UEFI enclave is initiated in the UEFI runtime;

provide a secure channel between the SMI handler and a deferral ticket minting process that is hosted in a secure enclave on the computing device, in which the secure channel is cryptographically protected using a symmetric key that is commonly shared by the SMI handler and the deferral ticket minting process in the enclave;

configure the ticket minting process for writing a deferral ticket to the secure channel in response to a determination by the deferral ticket minting process that a runtime state of the computing device adheres to a policy;

operate the SMI handler to defer the re-imaging of the computing device responsive to a deferral ticket being present in the secure channel; and utilize an SGX (Software Guard Extension) versioning protocol that enables provisioning of the common symmetric key to each of the UEFI enclave and the secure enclave hosting the deferral ticket minting process, wherein the UEFI enclave and the secure enclave hosting the deferral ticket minting process are enabled to provision the common symmetric key under the SGX versioning protocol by virtue of sharing a common author.

16. The one or more non-transitory computer-readable memory devices of claim 15 in which the runtime state of the computing device is monitored by one or more security monitors that are instantiated in the computing device.

17. The one or more non-transitory computer-readable memory devices of claim 15 in which the UEFI stores its instance of the common symmetric key in hardware-enforced isolated System Management Random Access Memory (SMRAM) and in which the ticket minting secure enclave stores its instance of the common symmetric key in hardware-enforced isolated Processor Reserved Memory (PRM).

18. The one or more non-transitory computer-readable memory devices of claim 15 in which the executed instructions further cause the computing device to receive a trusted beacon from a remote centralized authority, in which the ticket minting process writes a deferral ticket to the secure channel based on the trusted beacon, in which the trusted beacon comprises an unforgeable token that is signed by the centralized authority.

* * * * *